(12) United States Patent
Kato

(10) Patent No.: US 9,729,778 B2
(45) Date of Patent: Aug. 8, 2017

(54) FOCUS ADJUSTMENT DEVICE AND CONTROL METHOD OF THE SAME

(71) Applicant: CANON KABUSHIKI KAISHA, Tokyo (JP)

(72) Inventor: Ayumi Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 14/984,094

(22) Filed: Dec. 30, 2015

(65) Prior Publication Data

US 2016/0198085 A1    Jul. 7, 2016

(30) Foreign Application Priority Data

Jan. 7, 2015  (JP) .................. 2015-001632

(51) Int. Cl.
 *H04N 5/232* (2006.01)
 *H04N 9/04* (2006.01)

(52) U.S. Cl.
 CPC ......... *H04N 5/23212* (2013.01); *H04N 9/045* (2013.01)

(58) Field of Classification Search
 CPC ................................ H04N 5/23212
 USPC ....................................... 348/349
 See application file for complete search history.

(56) References Cited

U.S. PATENT DOCUMENTS

2013/0155276 A1*  6/2013  Ueda .................. G02B 7/36
                                              348/223.1

FOREIGN PATENT DOCUMENTS

JP        61-10044 B2    3/1986

* cited by examiner

*Primary Examiner* — Usman Khan
(74) *Attorney, Agent, or Firm* — Canon USA, Inc. I.P. Division

(57) ABSTRACT

A focus adjustment device includes an acquisition unit configured to acquire focus evaluated values of a plurality of color signals obtained from an image signal generated by an image sensor that light transmitted through a focus lens has entered, a calculation unit configured to calculate at least one value indicating a difference in magnitude between each pair of the focus evaluated values of the plurality of color signals, and a determination unit configured to determine, in a case in which a value calculated by the calculation unit is within a predetermined range, a drive direction of the focus lens based on the value calculated by the calculation unit, and determine, in a case in which the value calculated by the calculation unit is outside the predetermined range, a drive direction of the focus lens based on a luminance signal obtained from the image signal.

11 Claims, 14 Drawing Sheets

FOCUS ADJUSTMENT DEVICE AND CONTROL METHOD OF THE SAME

BACKGROUND OF THE INVENTION

Field of the Invention

The present disclosure relates to a focus adjustment device and a control method of the same. More specifically, the present disclosure relates to a technique relating to autofocusing used in electronic still cameras, videos, mobile phones, and the like.

Description of the Related Art

In digital cameras and video cameras, a general autofocusing method uses an output signal from an image sensor such as a charge-coupled device (CCD) sensor and a complementary metal-oxide semiconductor (CMOS) sensor, and detects a signal according to the contrast of a subject to perform focusing. In the above-described method, the contrast of the subject is sequentially detected while moving a focus lens throughout a predetermined moving range in an optical axis direction, and a position where the contrast reaches its peak is determined as a focus position of the focus lens.

With the above-described determination method, however, in a state before the lens is moved, it is difficult to determine in which direction the focus lens is to be driven.

In this manner, the lens drive direction cannot be determined in the state before the lens is moved. This causes a disadvantage in that focus adjustment requires time.

In connection with the drive direction of a focus lens, Japanese Patent Publication No. 61-10044 discloses the configuration of a focus position detection device that can easily determine in which direction the focus lens is to be driven and adjusted, by effectively utilizing chromatic aberration of the lens.

More specifically, the focus position detection device disclosed in Japanese Patent Publication No. 61-10044 detects light beams of two or more types having wavelengths different from each other, from among light beams transmitted through the focus lens, with light reception means arranged at positions optically equivalent to each other with respect to the focus lens. In addition, the focus position detection device is characterized by the configuration of determining a focus adjustment direction of the focus lens based on the difference between outputs from the respective signals that is caused by the chromatic aberration of the focus lens.

In the conventional technique disclosed in Japanese Patent Publication No. 61-10044 mentioned above, however, the configuration of the device needs to include a special detector for determining a focus adjustment direction.

In addition, in FIG. 4 on Page 3 of Japanese Patent Publication No. 61-10044 mentioned above, an intersection point of graphs of a focus evaluated value of blue color and a focus evaluated value of red color is indicated as a focus position. Nevertheless, the intersection point of the graphs of the focus evaluated value of blue color and the focus evaluated value of red color does not actually correspond to a focus position in some cases, because focus positions of red, blue, and red light beams are different from one another depending on the aberration generation statuses. Thus, if the focus is adjusted to a lens position corresponding to the position of the intersection point, a focus adjustment error may increase and a focus adjustment direction may be erroneously detected in the vicinity of the intersection point.

SUMMARY OF THE INVENTION

The present disclosure has been contrived in view of the above-described problems. The present disclosure aims to reduce the possibility of erroneously detecting a direction in the vicinity of a focus position in a focus lens drive direction determination operation, so as to perform focus adjustment at high speed.

According to an aspect of the present disclosure, a focus adjustment device includes an acquisition unit configured to acquire focus evaluated values of a plurality of color signals obtained from an image signal generated by an image sensor that light transmitted through a focus lens has entered, a calculation unit configured to calculate at least one value indicating a difference in magnitude between each pair of the focus evaluated values of the plurality of color signals, and a determination unit configured to determine, in a case in which a value calculated by the calculation unit is within a predetermined range, a drive direction of the focus lens based on the value calculated by the calculation unit, and determine, in a case in which the value calculated by the calculation unit is outside the predetermined range, a drive direction of the focus lens based on a luminance signal obtained from the image signal.

According to other aspects of the present disclosure, one or more additional focus adjustment devices, one or more imaging apparatuses, one or more control methods and one or more storage mediums are discussed herein. Further features of the present disclosure will become apparent from the following description of exemplary embodiments (with reference to the attached drawings).

DESCRIPTION OF THE EMBODIMENTS

First Exemplary Embodiment (Description of Schematic Configuration Example of Imaging Apparatus)

Preferred exemplary embodiments of the present disclosure will be described in detail below with reference to the drawings.

Figure 2:
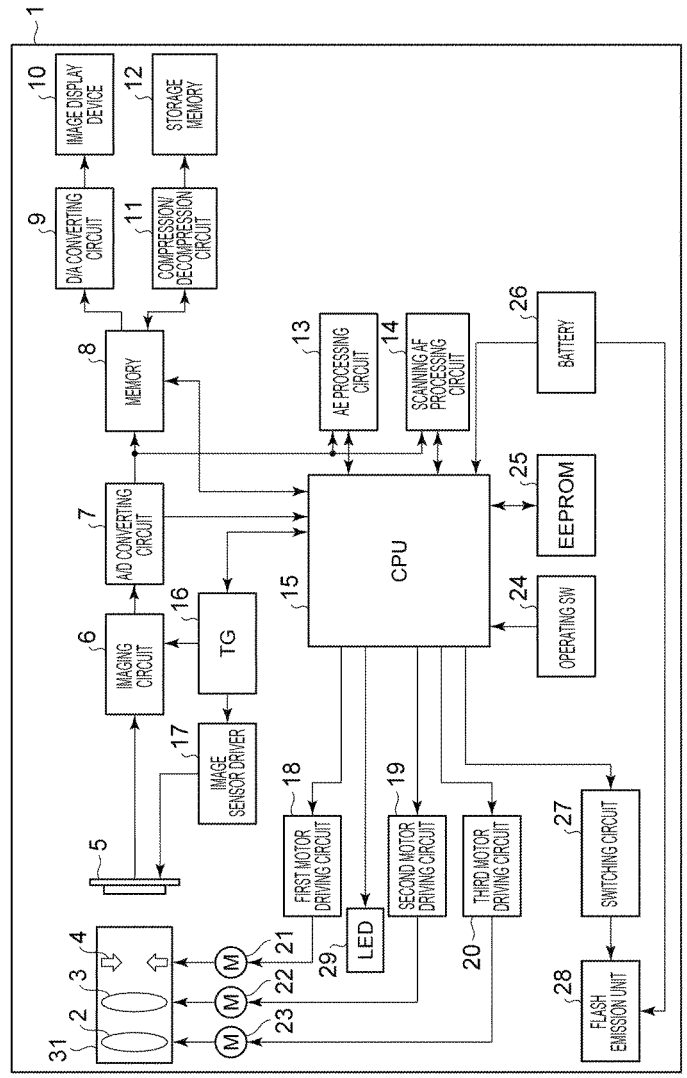
FIG. 2 is a block diagram of an imaging apparatus including a focus adjustment device.

FIG. 2 is a block diagram illustrating a schematic configuration example of an imaging apparatus 1 including a focus adjustment device according to an exemplary embodiment of the present disclosure. The imaging apparatus 1 includes, for example, a digital still camera and a digital video camera. The imaging apparatus 1, however, is not limited to these cameras. The present disclosure is applicable to any apparatus that acquires an entered optical image as an electrical image through photoelectric conversion performed using an image sensor having a two-dimensional array such as an area sensor.

An imaging optical system includes a zoom lens group 2 for a zooming operation and a focus lens group 3 for adjusting a focus state of a subject image. An aperture 4 serves as a light amount control unit for controlling the amount of light beams transmitted through the imaging optical system, and also serves as an exposure unit. A lens barrel 31 includes the zoom lens group 2, the focus lens group 3, the aperture 4, and the like.

The subject image transmitted through the imaging optical system is focused onto an image sensor 5, and the image sensor 5 photoelectrically-converts the subject image. An imaging circuit 6 generates a predetermined image signal by receiving an electrical signal photoelectrically-converted by the image sensor 5, and applying various types of image processing.

An analog-to-digital (A/D) converting circuit 7 converts an analog image signal generated by the imaging circuit 6, into a digital image signal. A memory 8 is a memory such as a video random access memory (VRAM) for temporarily storing the digital image signal output from the A/D converting circuit 7. A digital-to-analog (D/A) converting circuit 9 reads an image signal stored in the memory 8, and converts the read image signal into an analog signal as well as converting the image signal into an image signal in a form suitable for reproduction output.

An image display device 10 is a display device for displaying an image signal, and is, for example, a liquid crystal display (LCD) device or the like. A storage memory 12 is a memory such as a semiconductor memory for storing image data. A compression/decompression circuit 11 includes a decompression circuit for performing decoding processing, decompression processing, and the like. The compression/decompression circuit 11 includes a compression circuit for reading an image signal temporarily stored in the memory 8, and performing compression processing and encoding processing of image data for converting the image data into image data in a form suitable for storage into the storage memory 12. The compression/decompression circuit 11 further includes a decompression circuit for performing decoding processing and decompression processing of image data for converting the image data stored in the storage memory 12, into image data in a form suitable for reproduction and display.

In addition, an automatic exposure (AE) processing circuit 13 receives output from the A/D converting circuit 7 to perform AE processing. A scanning automatic focusing (AF) processing circuit 14 receives output from the A/D converting circuit 7 to perform AF processing. The scanning AF processing circuit 14 functions as a focus evaluated value calculation processing unit for calculating a focus evaluated value by extracting a specific frequency component from an image signal output from an imaging area of an image sensor that corresponds to a focus detection area. In the present exemplary embodiment, the focus detection area is used synonymously with an AF evaluation range.

In addition, the scanning AF processing circuit 14 calculates evaluated values used for direction determination and focus detection. These evaluated values will be described in detail later. A central processing unit (CPU) 15 controls operations of the entire imaging apparatus 1. In addition, the CPU 15 includes a memory for calculation to perform calculation for control. A timing generator (hereinafter, referred to as "TG") 16 generates a predetermined timing signal.

The CPU 15 performs focus position calculation and direction determination using various evaluated values calculated by the scanning AF processing circuit 14.

An image sensor driver 17 supplies a driving signal for driving the image sensor 5. An aperture driving motor 21 is a motor for driving the aperture 4. A first motor driving circuit 18 is a circuit for performing drive control of the aperture driving motor 21. A focus lens driving motor 22 is a motor for driving the focus lens group 3. A second motor driving circuit 19 is a circuit for performing drive control of the focus lens driving motor 22. A zoom driving motor 23 is a motor for driving the zoom lens group 2. A third motor driving circuit 20 is a circuit for performing drive control of the zoom driving motor 23.

The CPU 15 controls the focus lens driving motor 22 via the second motor driving circuit 19 using a focus evaluated value calculated by the scanning AF processing circuit 14.

Furthermore, an operating switch 24 is a switch including a group of various switches. An electrically erasable programmable read-only memory (EEPROM) 25 is an electrically rewritable read-only memory prestoring programs for performing various types of control, data used for performing various operations, and the like.

The imaging apparatus 1 further includes a battery 26, a flash emission unit 28, a switching circuit 27 for controlling the flash emission by the flash emission unit 28, and a display element 29 such as a light-emitting diode (LED) for displaying OK/NG of an AF operation.

In addition, a storage memory 12 serving as a storage medium for image data and the like is a fixed-type semiconductor memory such as a flash memory, and has a card shape or a stick shape. Furthermore, storage media in various forms are applicable. Examples of such storage media include a semiconductor memory such as a card-type flash memory configured to be detachable to the apparatus, a magnetic storage medium such as a hard disc and a flexible disk, and the like.

In addition, as the operating switch 24, a main power switch, a release switch, a reproduction switch, a zoom switch, a switch for turning ON/OFF the display of a focus evaluated value signal on a monitor, and the like are included. The main power switch is provided for starting up the imaging apparatus 1, and supplying power.

In addition, the release switch starts an image capturing operation (storage operation) and the like. The reproduction switch starts a reproduction operation. The zoom switch moves the zoom lens group 2 in the imaging optical system to perform zooming.

In addition, the release switch includes two switches. One is a first stroke (hereinafter, referred to as "SW1") for generating an instruction signal for starting AE processing and an AF operation that are to be performed prior to the image capturing operation. The other is a second stroke (hereinafter, referred to as "SW2") for generating an instruction signal for starting an actual exposure operation.

(Description of Various AF Evaluated Values)

Figure 3:
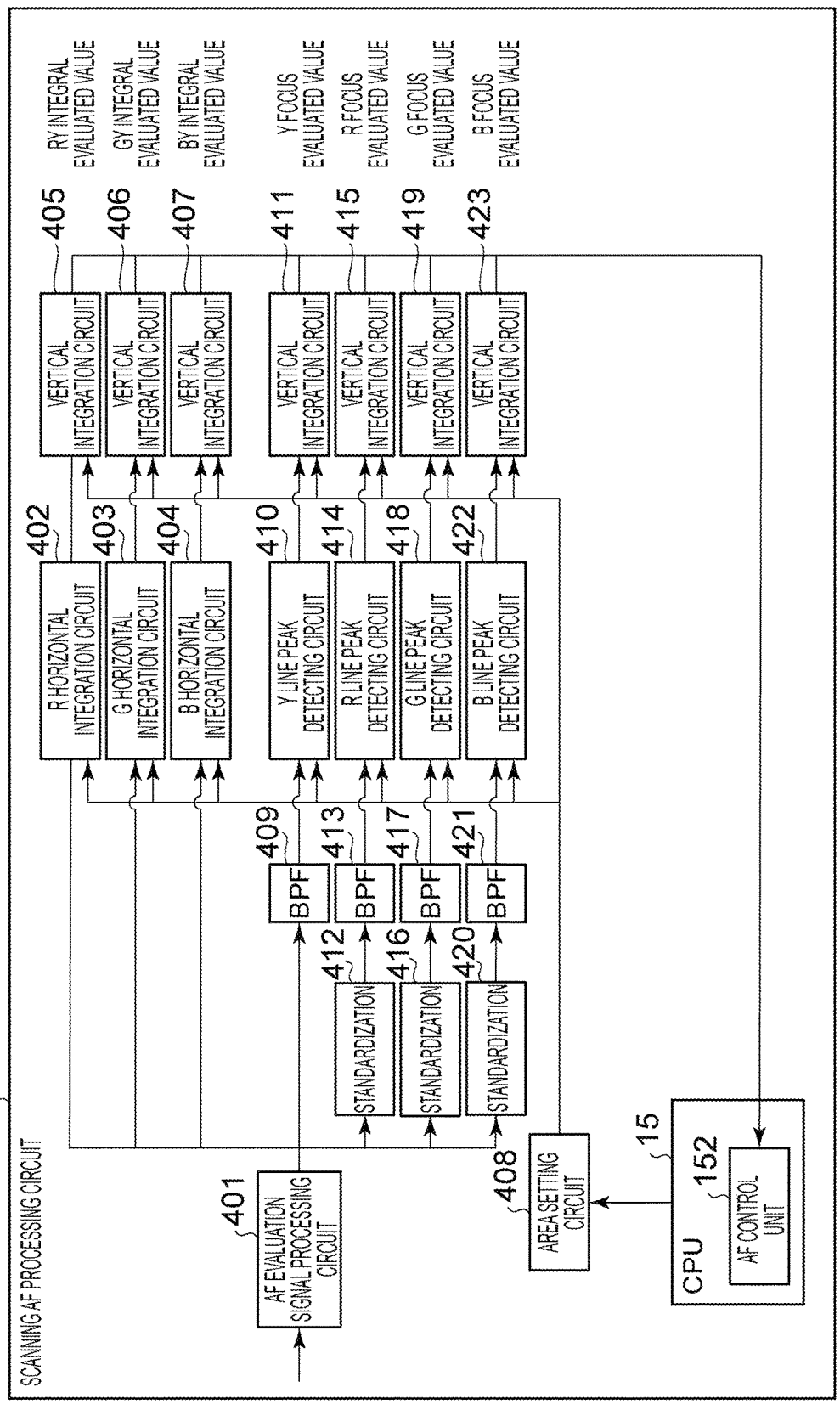
FIG. 3 is a block diagram of a circuit for calculating various evaluated values for AF.

Next, various AF evaluated values calculated using the CPU 15 and the scanning AF processing circuit 14 in FIG. 2 will be described with reference to FIG. 3.

When a digital signal converted by the A/D converting circuit 7 is input to the scanning AF processing circuit 14, an AF evaluation signal processing circuit 401 converts the input digital signal into a luminance signal Y, and performs gamma correction processing for enhancing low luminance components and suppressing high luminance components. In addition, the luminance signal Y having been subjected to the gamma correction processing includes luminance signals of three colors, i.e., a red luminance signal (hereinafter, referred to as "RY"), a green luminance signal (hereinafter, referred to as GY), and a blue luminance signal (hereinafter, referred to as "BY"), and a Y signal calculated by applying predetermined weights to the luminance signals RY, GY, and BY, and adding the weighted signals.

Figure 4A:
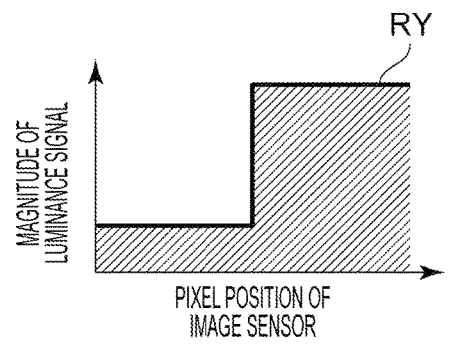
FIG. 4A is a diagram illustrating a relationship between unstandardized luminance signals of respective RGB colors and pixel positions.
Figure 4B:
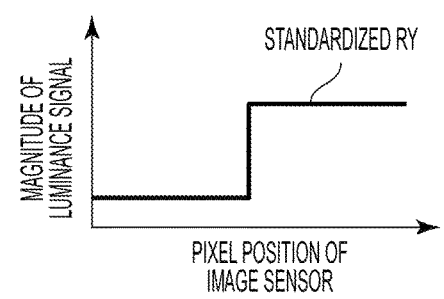
FIG. 4B is a diagram illustrating a relationship between standardized luminance signals of the respective RGB colors and pixel positions.
Figure 4B:
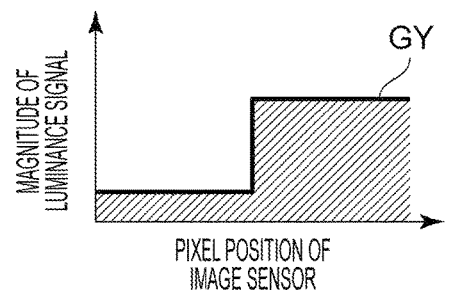
Figure 4B:
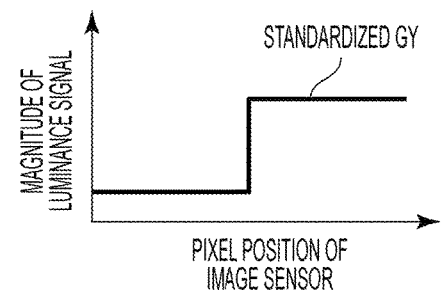
Figure 4B:
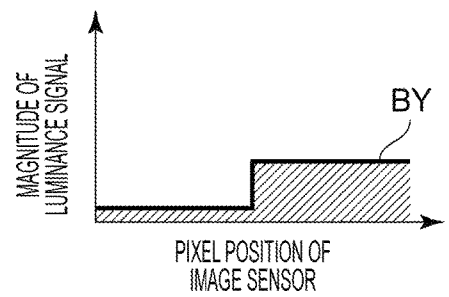
Figure 4B:
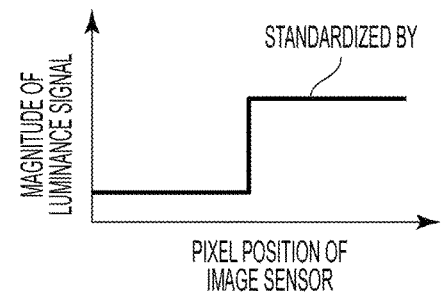

Here, FIGS. 4A and 4B are diagrams respectively illustrating a relationship between unstandardized luminance signals of the respective colors, i.e., red (hereinafter, referred to as "R"), green (hereinafter, referred to as "G"), and blue (hereinafter, referred to as "B"), and pixel positions, and a relationship between standardized luminance signals of the respective colors and pixel positions. In general, a subject includes components of each of RGB colors. Thus, in an outline part of the subject, the change forms of the luminance signals RY, GY, BY of three colors have approximately similarity shapes as illustrated in FIG. 4A.

In addition, a magnitude relationship between the luminance signals RY, GY, and BY varies depending on the spectral reflectance of the subject, the respective spectral sensitivities of RGB of the image sensor, and the like.

In the example illustrated in FIG. 4A, among components included a lot in the subject, the amount of components is larger in the order of red components, green components, and blue components.

In other words, FIG. 4A illustrates a case in which, at pixel positions corresponding to one another, a magnitude relationship between the luminance signals RY, GY, and BY satisfies the following relationship:

$$RY > GY > BY \qquad (1).$$

Next, referring back to FIG. 3, the calculation method of an RY integral evaluated value will be described. The luminance signals RY included in the gamma-corrected luminance signals Y are input to an R horizontal integration circuit 402 for integrating the luminance signals RY for each horizontal line. The R horizontal integration circuit 402 precalculates, for each horizontal line, an integral value of RY outputs within an AF evaluation range set by an area setting circuit 408.

Furthermore, the outputs from the R horizontal integration circuit 402 are input to an R vertical integration circuit 405. The R vertical integration circuit 405 performs integration in a vertical direction within the AF evaluation range set by the area setting circuit 408, to generate an RY integral evaluated value.

The calculation method of a GY integral evaluated value is similar to the above-described method. The GY integral evaluated value is generated through a G horizontal integration circuit 403 and a G vertical integration circuit 406.

The calculation method of a BY integral evaluated value is similar to the above-described method. The BY integral evaluated value is generated through a B horizontal integration circuit 404 and a B vertical integration circuit 407.

For the subject having a similar luminance distribution to the luminance distribution illustrated in FIG. 4A even in a vertical direction, a ratio between the RY, GY, and BY integral evaluated values corresponds to a ratio between the areas of the luminance signals RY, GY, and BY. Based on the relationship (1), it can be seen that the RY, GY, and BY integral evaluated values satisfy the following relationship:

$$RY \text{ integral evaluated value} > GY \text{ integral evaluated value} > BY \text{ integral evaluated value} \qquad (2).$$

The RY, GY, and BY integral evaluated values are used for standardization of luminance signals.

Next, referring back to FIG. 3, the calculation method of a Y focus evaluated value will be described.

When the Y signal included in the gamma-corrected luminance signal Y is transmitted through a band-pass filter (BPF) 409, specific frequency components are extracted to generate a focus signal. The generated focus signal is input to a Y line peak detecting circuit 410 serving as a peak holding unit for detecting a line peak value for each horizontal line.

The Y line peak detecting circuit 410 obtains, for each horizontal line, a line peak value within the AF evaluation range. The obtained line peak value is integrated in a vertical direction by a vertical integration circuit 411 within the AF evaluation range set by the area setting circuit 408, so that a Y focus evaluated value is generated.

Next, the calculation methods of an R focus evaluated value, a G focus evaluated value, and a B focus evaluated value will be described. The luminance signal RY included in the gamma-corrected luminance signal Y is standardized through a standardization 412. Similarly, the luminance signals GY and BY are standardized through standardizations 416 and 420, respectively. The standardization method is indicated by the following formulae:

$$\text{standardized } RY = RY/\overline{RY} \text{ integral evaluated value} \quad (3)$$

$$\text{standardized } GY = GY/\overline{GY} \text{ integral evaluated value} \quad (4)$$

$$\text{standardized } BY = BY/\overline{BY} \text{ integral evaluated value} \quad (5).$$

FIG. 4B illustrates standardized luminance signals RY, GY, and BY. As seen from the relationship between FIGS. 4A and 4B, while the unstandardized luminance signals of the respective colors have magnitudes different from one another, the luminance signals are changed to have approximately the same magnitude after standardization. By uniformizing the signals through standardization in this manner, direction detection performance to be described later increases.

When the standardized luminance signal RY is transmitted through a BPF 413, specific frequency components are extracted to generate a focus signal. The generated focus signal is input to an R line peak detecting circuit 414 serving as a peak holding unit for detecting a line peak value for each horizontal line.

The R line peak detecting circuit 414 obtains, for each horizontal line, a line peak value within the AF evaluation range. The obtained line peak value is integrated in a vertical direction by a vertical integration circuit 415 within the AF evaluation range set by the area setting circuit 408, so that an R focus evaluated value is generated.

Similarly, when the standardized luminance signal GY is transmitted through a BPF 417, a G line peak detecting circuit 418, and a vertical integration circuit 419, a G focus evaluated value is generated. When the standardized luminance signal BY is transmitted through a BPF 421, a B line peak detecting circuit 422, and a vertical integration circuit 423, a B focus evaluated value is generated.

Hereinafter, the description will be given assuming that the R focus evaluated value, the G focus evaluated value, and the B focus evaluated value are values calculated using the standardized luminance signals.

The area setting circuit 408 generates a gate signal for the AF evaluation range for selecting a signal at a predetermined position in a screen that is set by the CPU 15. The gate signal is input to the R horizontal integration circuit 402, the G horizontal integration circuit 403, the B horizontal integration circuit 404, the Y line peak detecting circuit 410, the R line peak detecting circuit 414, the G line peak detecting circuit 418, and the B line peak detecting circuit 422. In addition, the gate signal is input to the vertical integration circuits 405, 406, 407, 411, 415, 419, and 423. As a result, a timing at which the luminance signal Y is input to each circuit is controlled so that each focus evaluated value is generated based on the luminance signal Y within the AF evaluation range.

An AF control unit 152 performs AF control in the following manner. First, the AF control unit 152 takes in each focus evaluated value. Then, the AF control unit 152 controls the focus lens driving motor 22 through the second motor driving circuit 19 to move the focus lens group 3 in an optical axis direction.

In the present exemplary embodiment, various AF evaluated values are calculated in a horizontal line direction. Nevertheless, the AF evaluated values are only required to be calculated in either or both of horizontal and vertical directions.

(Description of Flowchart of Focus Position Determination)

Figure 1:
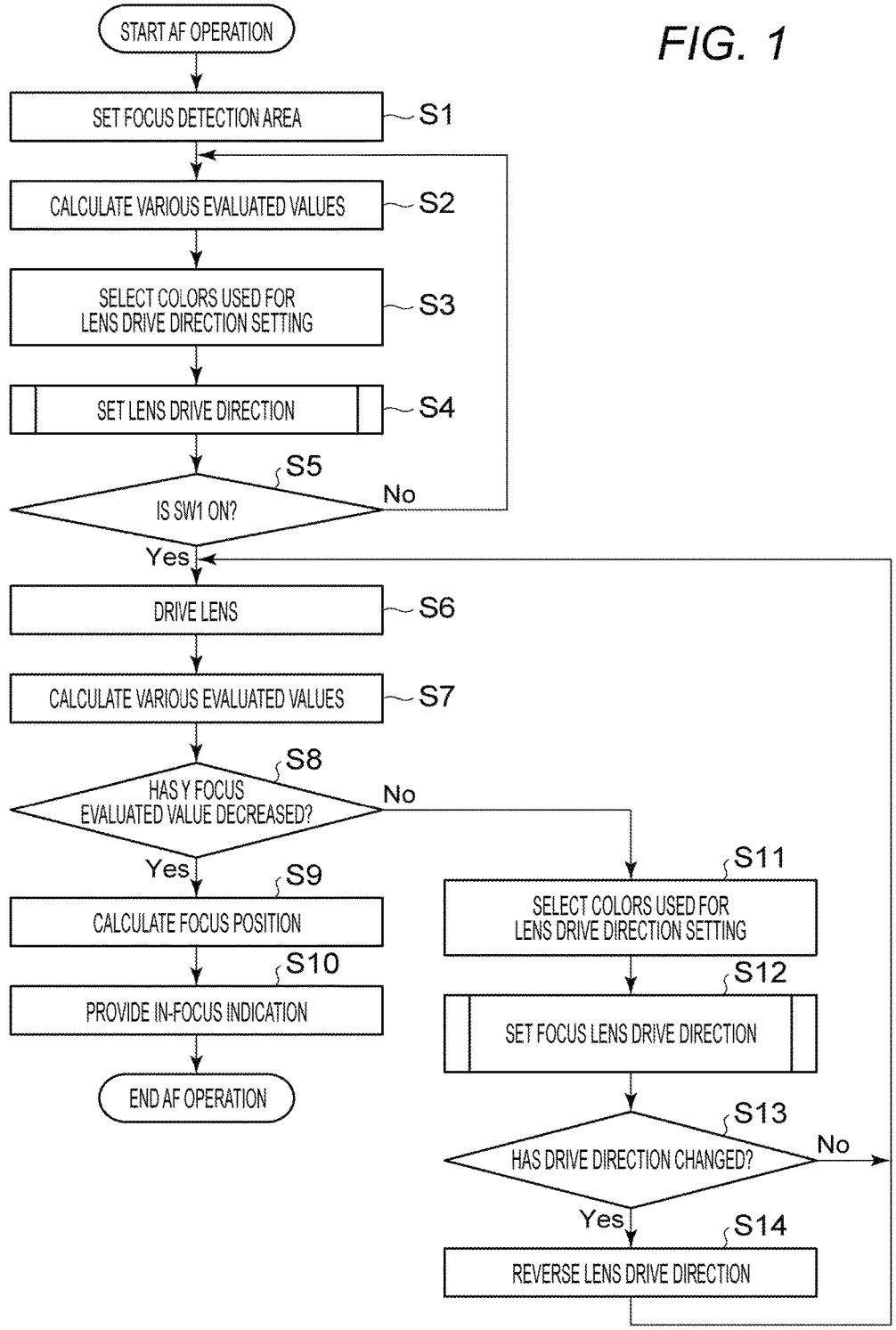
FIG. 1 is a flowchart illustrating an automatic focusing (AF) operation procedure according to a first exemplary embodiment.

Next, a focusing operation (AF operation) of the imaging apparatus 1 having the above-described configurations according to an exemplary embodiment will be described with reference to FIG. 1. FIG. 1 is a flowchart illustrating an AF operation procedure of the focus adjustment device according to an exemplary embodiment. A control program related to this operation is executed by the CPU 15.

When the AF operation is started, the area setting circuit 408 included in the CPU 15 first sets an AF evaluation range for adjusting the focus onto a subject. In the process in step S1, one focus detection area is set in an image. The AF evaluation range (focus detection area) is a range for evaluating an image signal for performing focus adjustment by an AF operation to be described later. The object of the AF operation is to adjust the focus onto a subject in the AF evaluation range (focus detection area) that is intended by a photographer.

In step S2, the CPU 15 calculates a Y focus evaluated value, an R focus evaluated value, a G focus evaluated value, and a B focus evaluated value in the respective focus detection areas set in step S1.

Next, in step S3, the CPU 15 selects two colors from R, G, and B. The selected two colors will be hereinafter referred to as a first color and a second color. Two colors optimum for setting a focus lens drive direction vary depending on chromatic aberration characteristics of a lens and a focus lens position. Thus, it is only required that optimum two colors are selected.

In addition, a plurality of pairs of optimum two colors may be selected.

Figure 5A:
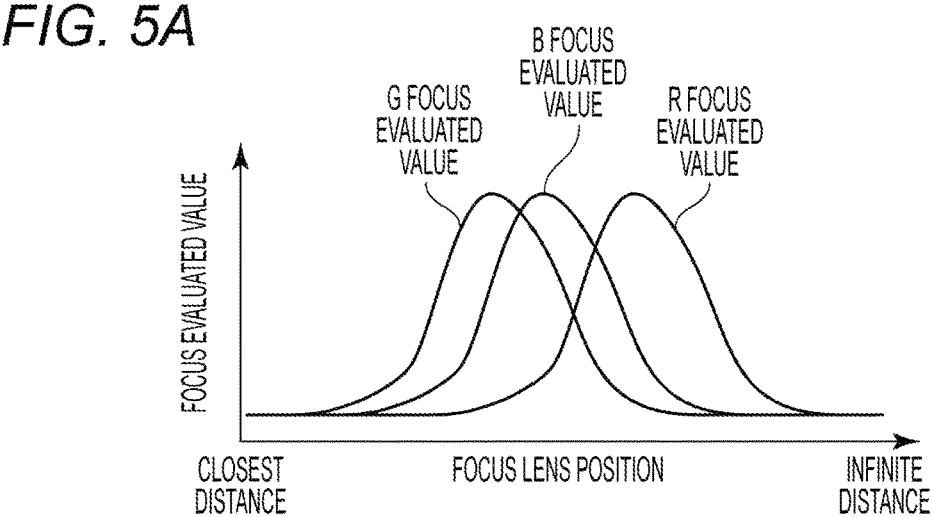
FIG. 5A is a diagram illustrating a relationship between focus evaluated values of the respective RGB colors and a focus lens position.

From here, a method for selecting optimum two colors will be described with reference to FIGS. 5A to 5C. FIG. 5A is a diagram illustrating an example of a relationship between R, G, and B focus evaluated values and a focus lens position. It can be seen that there is a difference in peak position in a horizontal axis direction between the R, G, and B focus evaluated values due to chromatic aberration. Using two focus evaluated values among the total of three focus evaluated values (R, G, and B focus evaluated values), i.e., focus evaluated values of the first color and the second color that are selected in step S3 in FIG. 1, the CPU 15 sets a lens drive direction in step S4.

The lens drive direction setting in step S4 is performed using a magnitude relationship between two focus evaluated values. The details of the setting will be described later.

Figure 5B:
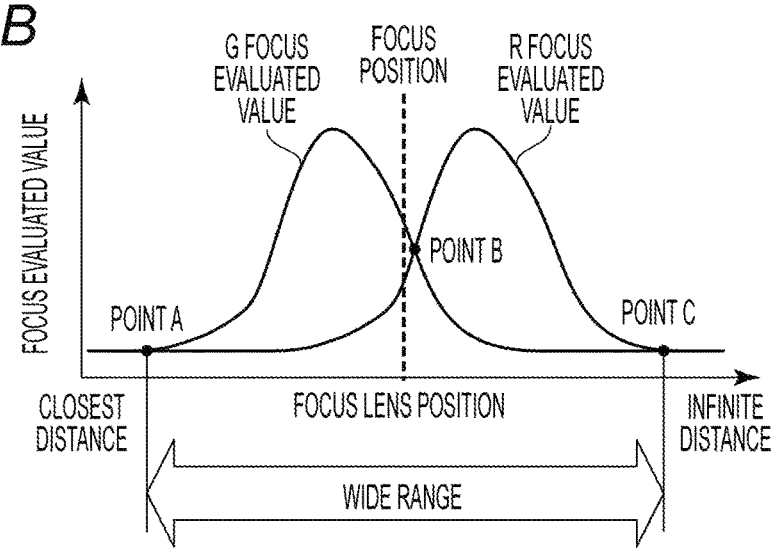
FIG. 5B is a diagram illustrating a relationship between G and R focus evaluated values and a focus lens position.

FIG. 5B illustrates an example of selecting focus evaluated values of the first and second colors. FIG. 5B illustrates a case in which two focus evaluated values are selected from the focus evaluated values in FIG. 5A, and G and R are set as the first color and the second color, respectively. The graphs of the G and R focus evaluated values intersects with each other at three points, i.e., points A, B, and C to have the equal value at these points.

When a focus lens position is located between the points A and B, the G and R focus evaluated values satisfy the following relationship:

$$G \text{ focus evaluated value} > R \text{ focus evaluated value} \quad (6).$$

When a focus lens position is located between the points B and C, the G and R focus evaluated values satisfy the following relationship:

$$G \text{ focus evaluated value} < R \text{ focus evaluated value} \quad (7).$$

By utilizing these relationships, a direction in which a focus lens position (hereinafter, referred to as a "focus position") where an in-focus state is caused exists is determined. The focus position is located in the vicinity of the point B. Thus, it can be determined that the focus position is in an infinite distance direction when the G and R focus evaluated values satisfy the relationship (6), and the focus position is in a closest distance direction when the G and R focus evaluated values satisfy the relationship (7). To be exact, the focus position does not coincide with the point B. Thus, the above-described determination method may not work out. Such erroneous determination in the vicinity of the focus position will be described later in detail.

Figure 5C:
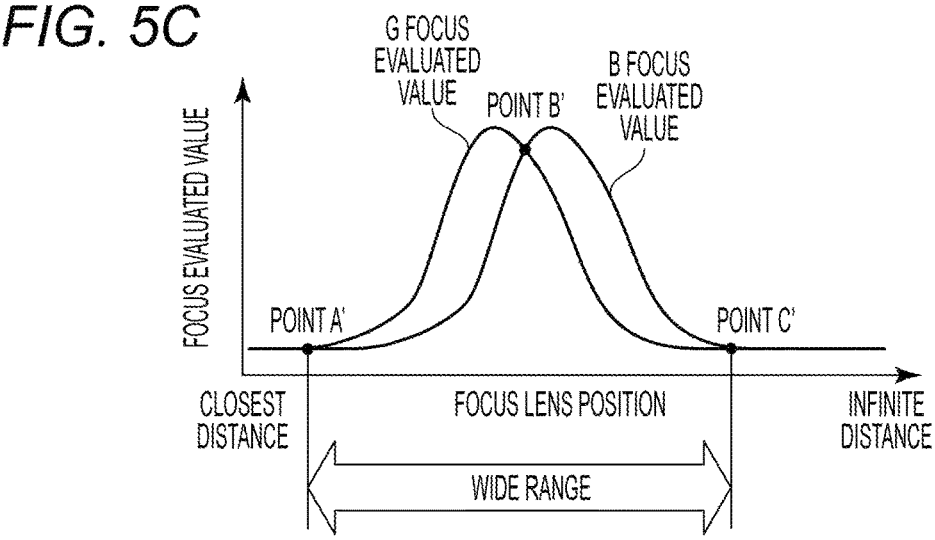
FIG. 5C is a diagram illustrating a relationship between G and B focus evaluated values and a focus lens position.

Similarly, FIG. 5C illustrates another example of selecting focus evaluated values of the first and second colors. FIG. 5C illustrates a case in which two focus evaluated values are selected from the focus evaluated values in FIG. 5A, and G and B are set as the first color and the second color, respectively. The graphs of the G and B focus evaluated values intersects with each other at three points, i.e., points A', B', and C' to have the equal value at these points.

When a focus lens position is located between the points A' and B', the G and B focus evaluated values satisfy the following relationship:

$$G \text{ focus evaluated value} > B \text{ focus evaluated value} \qquad (8).$$

When a focus lens position is located between the points B' and C', the G and B focus evaluated values satisfy the following relationship:

$$G \text{ focus evaluated value} < B \text{ focus evaluated value} \qquad (9).$$

Similarly, by utilizing these relationships, a direction in which a focus position exists is determined. The focus position is located in the vicinity of the point B'. Thus, it can be determined that the focus position is in an infinite distance direction when the G and B focus evaluated values satisfy the relationship (8), and the focus position is in a closest distance direction when the G and B focus evaluated values satisfy the relationship (9). To be exact, the focus position does not coincide with the point B'. Thus, the above-described determination method may not work out. Such erroneous determination in the vicinity of the focus position will be described later in detail.

From here, a determinable range and an indeterminable range of a direction in which a focus position exists will be described. In other words, a settable range and an unsettable range of a lens drive direction will be described.

In FIG. 5B, in the respective ranges outside the points A and C, the graphs of the G and R focus evaluated values keep the intersecting state to have the approximately equal value. In these ranges, since a magnitude relationship between the two focus evaluated values cannot be read, an in-focus direction cannot be determined.

In other words, when G and R are selected as the first color and the second color, respectively, a lens drive direction is settable only in a range indicated by an arrow illustrated in FIG. 5B. Similarly, when G and B are selected as the first color and the second color, respectively, a lens drive direction is settable only in a range indicated by an arrow illustrated in FIG. 5C.

When FIG. 5B is compared with FIG. 5C, it can be seen that a lens drive direction settable range in FIG. 5B is wider than that in FIG. 5C.

In view of the foregoing, as the distance between peak points of graphs of two focus evaluated values increases, lens drive direction setting can be performed in a wider focus lens range.

In addition, a selection method of two optimum colors may be changed depending on signal-to-noise (S/N) ratios of focus evaluated values of the respective colors. As described above, the R, G, and B focus evaluated values are calculated from the standardized luminance signals RY, GY, and BY. Since used signals are standardized to have uniform gains, the gains at the peaks of focus evaluated values of the respective colors are uniform as illustrated in FIG. 5A.

Nevertheless, if the luminance signals RY, GY, and BY include a signal with a small value, the noise of the signal is amplified after standardization, so that it becomes difficult to determine a magnitude relationship between the focus evaluated values. In such a case, although the gains at the peaks of the focus evaluated values of the respective colors are uniform, a focus evaluated value with an amplified noise is included. Thus, when a magnitude relationship between graphs of focus evaluated values of selected two colors is determined, if a focus evaluated value with an amplified noise is used, the magnitude relationship cannot be accurately detected. This makes it difficult to determine a lens drive direction. In view of the foregoing, if an S/N ratio of a certain color is low, a lens drive direction is determined using two colors excluding the color.

As described above, the selection methods of two optimum colors include a method of using a difference in peak position, and a method of using S/N ratios of focus evaluated values. If two colors with peak positions of focus evaluated values thereof being distant, and with small noises after standardization are selected using both of the methods, more optimum two colors can be selected.

The description of the selection methods of two optimum colors ends, and the description returns again to the flowchart in FIG. 1. In step S4, the CPU 15 sets a lens drive direction using the two colors determined in step S3. The details of the setting method of a lens drive direction will be described later.

In step S5, the CPU 15 evaluates whether the above-mentioned button SW1 (the first stroke for generating an instruction signal for starting the AE processing and the AF operation that are to be performed prior to the image capturing operation) has been pressed. If the button SW1 is OFF (NO in step S5), the CPU 15 repeats steps S2 to S4. If the button SW1 is ON (YES in step S5), the processing proceeds to step S6.

In step S6, the AF control unit 152 drives the focus lens group 3 in the lens drive direction set in step S4, at a predetermined speed and by a predetermined amount. In addition, if a lens drive direction is not set in step S4 or S12, the AF control unit 152 drives the focus lens group 3 in a predetermined direction at a predetermined speed and by a predetermined amount.

In step S7, similarly to step S2, the CPU 15 calculates a Y focus evaluated value, an R focus evaluated value, a G focus evaluated value, and a B focus evaluated value in the respective focus detection areas set in step S1.

In step S8, the CPU 15 evaluates whether the Y focus evaluated value, which is a focus evaluated value indicating an in-focus state, has decreased as compared with that obtained before the lens driving. If it is determined that the Y focus evaluated value has not decreased but increased (NO in step S8), the processing proceeds to step S11.

In step S11, similarly to step S3, the CPU 15 selects two colors (the first and second colors) from R, G, and B. Two colors optimum for setting a lens drive direction vary depending on chromatic aberration characteristics of a lens and a focus lens position. Thus, it is only required that optimum two colors are selected.

In addition, a plurality of pairs of optimum two colors may be selected.

In step S12, the CPU 15 sets a lens drive direction using the two colors determined in step S11. The details of the setting method of a lens drive direction will be described later.

In step S13, the CPU 15 evaluates whether a lens drive direction has changed or not. If it is determined in step S13 that a lens drive direction has changed (YES in step S13), the processing proceeds to step S14, in which the CPU 15 reverses the lens drive direction. Then, the processing returns again to step S6, in which the AF control unit 152 drives the focus lens group 3 in a reverse direction of the lens drive direction set in step S12, at a predetermined speed and by a predetermined amount.

On the other hand, if it is determined in step S13 that a lens drive direction has not changed (NO in step S13), the processing returns again to step S6 without changing the lens drive direction. In step S6, the AF control unit 152 drives the focus lens group 3 in the lens drive direction set in step S12, at a predetermined speed and by a predetermined amount.

The description has been given of a case in which it is determined in step S8 that the Y focus evaluated value has increased. The description returns to a case in which it is determined in step S8 that the Y focus evaluated value has decreased. If it is determined in step S8 that the Y focus evaluated value has decreased (YES in step S8), the processing proceeds to step S9, in which the CPU 15 calculates a focus position using the Y focus evaluated value. Then, the processing proceeds to step S10.

An example of a detailed focus position calculation method is as follows. A peak position of a hill-shaped graph of the Y focus evaluated value, which is a focus evaluated value indicating an in-focus state, is calculated based on the length of a portion of the graph that tilts with an inclination of a certain value or more, and the change degree of inclination of the tilt portion. The peak position of the Y focus evaluated value is nothing less than a focus position. Thus, the focus position can be calculated.

Then, in step S10, the CPU 15 provides in-focus indication, and the present AF operation ends.

(Description of Lens Drive Direction Setting)

The lens drive direction setting in steps S4 and S12 in FIG. 1 will be described in detail with reference to FIGS. 6 to 7C.

Figure 6:
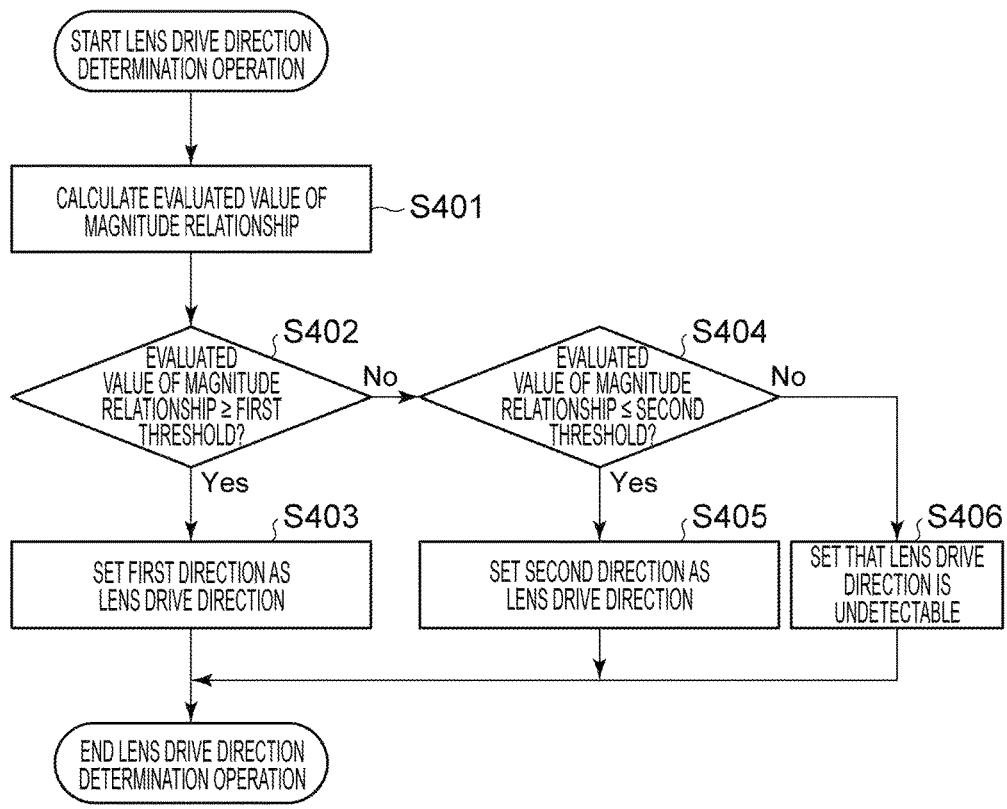
FIG. 6 is a flowchart illustrating a drive direction determination procedure according to the first exemplary embodiment.

FIG. 6 corresponds to a subroutine of steps S4 and S12 in FIG. 1, and is a flowchart illustrating a lens drive direction determination operation procedure. All the processes in FIG. 6 are performed by the CPU 15.

In step S401, the CPU 15 calculates an evaluated value of a magnitude relationship. The evaluated value of the magnitude relationship indicates a magnitude relationship between the G and R focus evaluated values, and corresponds to a difference or a ratio between the two focus evaluated values. In the present exemplary embodiment, the evaluated value of the magnitude relationship is calculated based on the difference. An example of calculating an evaluated value of a magnitude relationship based on the ratio will be described later as a modified example. In the present exemplary embodiment, the description will be given assuming that G and R are set as the first color and the second color, respectively.

The evaluated value of the magnitude relationship can be obtained by the following formula:

$$(\text{magnitude relationship evaluated value}) = (G \text{ focus evaluated value}) - (R \text{ focus evaluated value}) \quad (10).$$

Figure 7A:
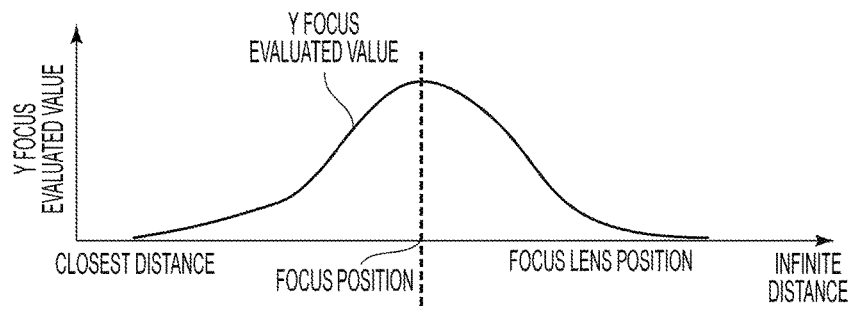
FIG. 7A is a diagram illustrating a relationship between a Y focus evaluated value and a focus lens drive direction according to the first exemplary embodiment.

Here, FIG. 7A is a diagram illustrating a relationship between a Y focus evaluated value and a focus lens position.

As described above, in an autofocusing method of bringing the subject into focus by detecting a signal according to the contrast of the subject, a focus lens position where the Y focus evaluated value reaches its peak corresponds to a position where the contrast of the subject reaches its peak. This peak-reached position is determined as a focus position of the focus lens.

Figure 7B:
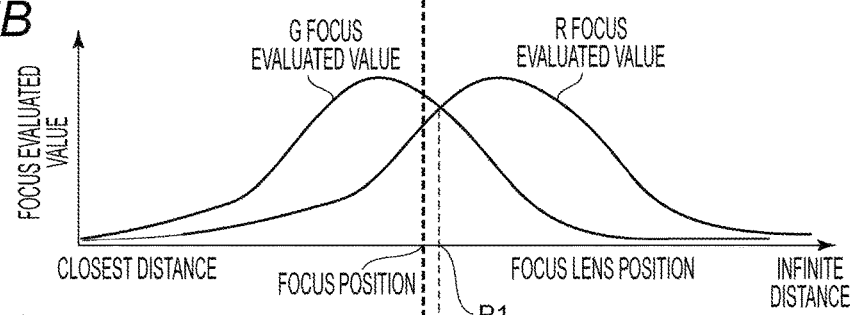
FIG. 7B is a diagram illustrating a relationship between G and R focus evaluated values and a focus lens drive direction.

FIG. 7B is a diagram illustrating a relationship between G and R focus evaluated values and a focus lens position.

Figure 7C:
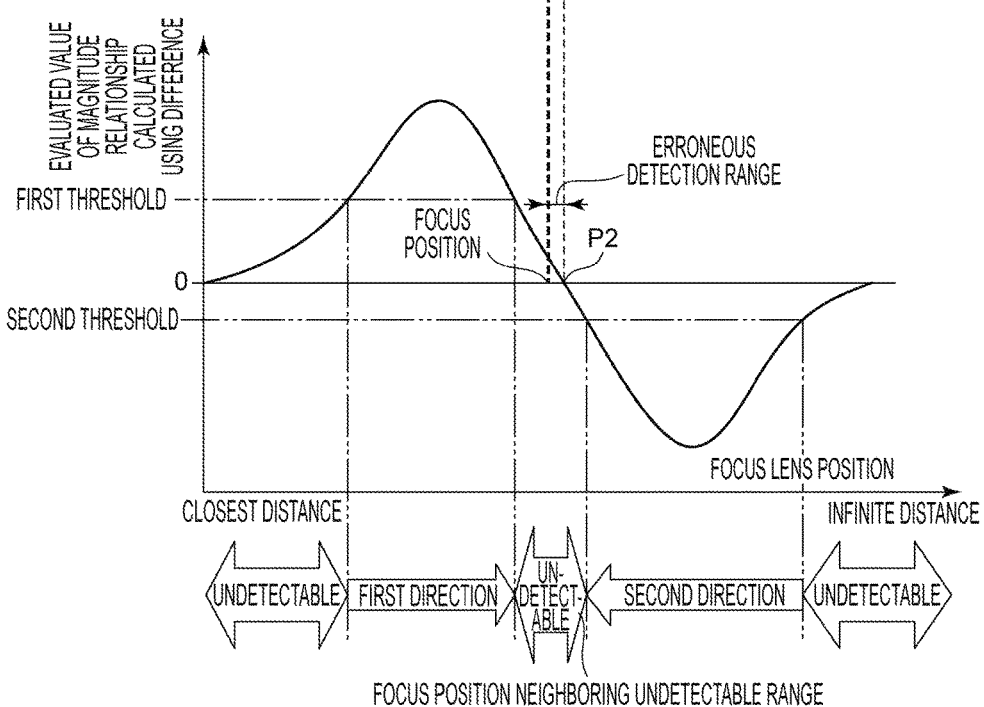
FIG. 7C is a diagram illustrating a relationship between an evaluated value of a magnitude relationship used for focus lens drive direction setting and a focus lens drive direction.

FIG. 7C is a diagram illustrating a relationship between an evaluated value of a magnitude relationship and a lens drive direction. In FIG. 7C, a vertical axis indicates an evaluated value of a magnitude relationship, and a horizontal axis indicates a focus lens position. An evaluated value of a magnitude relationship becomes 0 when the G and R focus evaluated values coincide with each other. Thus, focus lens positions at a point P1 (a cross point of the G and R focus evaluated values) in FIG. 7B and at a point P2 in FIG. 7C coincide with each other.

At this time, when an evaluated value of a magnitude relationship has a positive value, a relationship G focus evaluated value>R focus evaluated value is satisfied. When an evaluated value of a magnitude relationship has a negative value, a relationship G focus evaluated value<R focus evaluated value is satisfied.

Based on the relationships, a focus lens drive direction can be determined in the above-described manner.

The lens is only required to be driven in a first direction when an evaluated value of a magnitude relationship has a positive value, and to be driven in a second direction opposite to the first direction, when an evaluated value of a magnitude relationship has a negative value.

Nevertheless, as seen from the comparison between FIGS. 7A and 7B, there is a difference between a focus position indicated by a thick dotted line and a cross point (hereinafter, referred to as "point P1") of the G and R focus evaluated values that is indicated by a thin dotted line.

Such a difference is generated in various manners every time focus adjustment is performed in the following cases. The difference is generated in a case in which a peak position (focus position) of the Y focus evaluated value changes with respect to a positional relationship between RGB focus evaluated values due to spectral distribution of an optical image of the subject. Alternatively, the difference is generated in a case in which an evaluated value of a magnitude relationship that is calculated from focus evaluated values of two colors includes an error due to an error caused by standardization of luminance signals that is performed when RGB focus evaluated values are calculated, and the position of the point P2 in FIG. 7C deviates.

For example, when a focus lens is positioned in a range between the focus position and the point P2 in FIG. 7C, an evaluated value of a magnitude relationship is a positive value. Thus, the first direction is set as a lens drive direction. There, however, is a problem point in that the first direction is a direction opposite to a correct focus position, and the direction is erroneously detected.

Thus, in order to avoid erroneous lens driving, a first threshold and a second threshold are provided for an evaluated value of a magnitude relationship, thereby preventing erroneous detection in the vicinity of a focus position.

In order to prevent erroneous detection in the vicinity of a focus position, first, the range between the focus position and the point P2 is excluded as an erroneous detection range. As described above, however, a positional relationship of an evaluated value of a magnitude relationship in a horizontal axis direction with respect to the focus position varies every time focus adjustment is performed. Thus, a range needs to be set with an allowance of a predetermined amount with respect to the focus position.

In light of the foregoing, as illustrated in FIG. 7C, besides the range (hereinafter, referred to as an "erroneous detection range") between the focus position and the point P2, a range (hereinafter, referred to as a "focus position neighboring undetectable range") set with the allowance of the predetermined amount is excluded as an undetectable range. The closest distance side end of the focus position neighboring undetectable range is determined based on the first threshold, and the infinite distance side end of the focus position neighboring undetectable range is determined based on the second threshold.

In other words, the processing determines a focus lens position where an evaluated value of a magnitude relationship in a state in which magnitudes of two focus evaluated values are equal is calculated. In addition, the processing corresponds to setting the first and second thresholds so that a range from a focus lens position closest to a focus lens position where an in-focus state is caused, to the focus lens position where the in-focus state is caused is included in the undetectable range.

The description returns again to the flowchart in FIG. 6. If it is determined in step S402 that an evaluated value of a magnitude relationship is equal to or larger than the first threshold (YES in step S402), the processing proceeds to step S403 in FIG. 6. In step S403, the first direction is set as a lens drive direction, and the processing ends.

If it is determined in step S402 that an evaluated value of a magnitude relationship is less than the first threshold (NO in step S402), the processing proceeds to step S404. If it is determined in step S404 that an evaluated value of a magnitude relationship is equal to or smaller than the second threshold (YES in step S404), the processing proceeds to step S405. In step S405, the second direction is set as a lens drive direction, and the processing ends.

If it is determined in step S404 that an evaluated value of a magnitude relationship is larger than the second threshold (NO in step S404), the processing proceeds to step S406. In step S406, it is set that a lens drive direction is undetectable, and the processing ends.

In addition, in the present exemplary embodiment, G and R are set as the first color and the second color, respectively. Alternatively, a plurality of pairs of the first color and the second color may be selected. In FIG. 1, colors are selected in steps S3 and S11. When a plurality of pairs of colors is selected, every time color selection is performed a plurality of times, a combination of two optimum colors is selected from the plurality of pairs of colors.

Lens drive direction settable ranges in steps S4 and S12 in FIG. 1 vary depending on which two colors are selected. Thus, even when a drive direction is undetectable with a certain pair, selecting a different pair may enable lens drive direction setting.

In other words, although selection of a plurality of pairs of colors increases a calculation amount, a lens drive direction detectable range can be increased as compared with that when a pair of colors is selected.

In the present exemplary embodiment, an evaluated value of a magnitude relationship is calculated based on a difference between focus evaluated values of two colors. The calculation method, however, is not limited thereto. For example, an evaluated value of a magnitude relationship may be obtained based on a ratio between focus evaluated values of two colors. The description will be given below of an example of calculating an evaluated value of a magnitude relationship based on the ratio.

In addition, other than the calculation method of an evaluated value of a magnitude relationship, all the configurations are similar to the above-described configurations, and similar operations are performed. Thus, the descriptions thereof will be omitted.

An example of calculating an evaluated value of a magnitude relationship based on the ratio will be described below with reference to FIGS. 8A to 8C.

In the present exemplary embodiment, since G and R are set as the first color and the second color, respectively, an evaluated value of a magnitude relationship can be obtained by the following formula:

(magnitude relationship evaluated value)=($G$ focus evaluated value)/($R$ focus evaluated value)    (11).

Figure 8A:
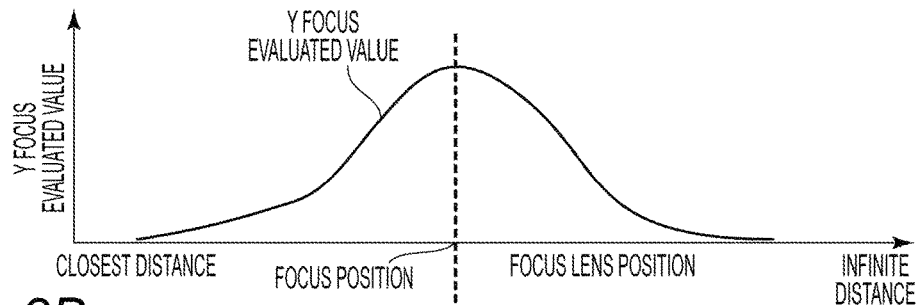
FIG. 8A is a diagram illustrating a relationship between a Y focus evaluated value and a focus lens drive direction according to the first exemplary embodiment.

FIG. 8A is a diagram illustrating a relationship between a Y focus evaluated value and a focus lens position. As described above, in autofocusing method of bringing the subject into focus by detecting a signal according to the contrast of the subject, a focus lens position where the Y focus evaluated value reaches its peak corresponds to a position where the contrast of the subject reaches its peak. This peak-reached position is determined as a focus position of the focus lens.

Figure 8B:
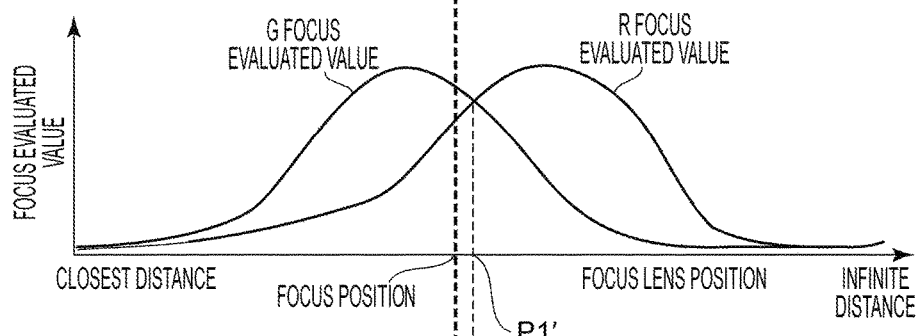
FIG. 8B is a diagram illustrating a relationship between G and R focus evaluated values and a focus lens drive direction.

FIG. 8B is a diagram illustrating a relationship between G and R focus evaluated values and a focus lens position.

Figure 8C:
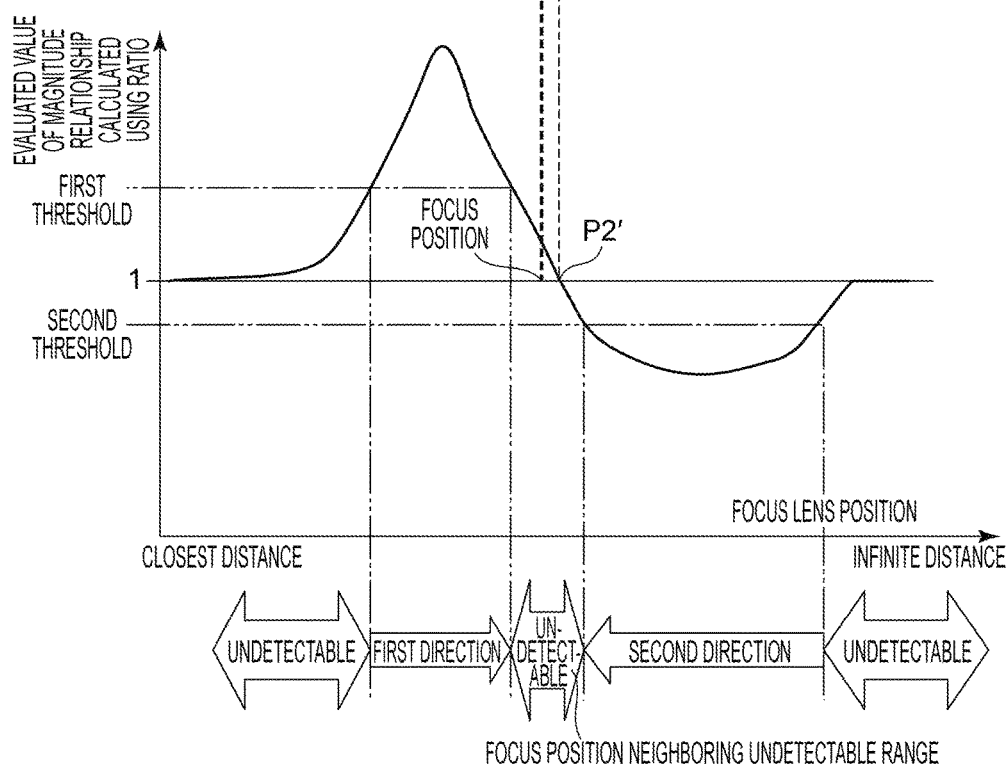
FIG. 8C is a diagram illustrating a relationship between an evaluated value of a magnitude relationship used for focus lens drive direction setting and a focus lens drive direction.

FIG. 8C is a diagram illustrating a relationship between an evaluated value of a magnitude relationship and a lens drive direction. In FIG. 8C, a vertical axis indicates an evaluated value of a magnitude relationship, and a horizontal axis indicates a focus lens position. An evaluated value of a magnitude relationship becomes 1 when the G and R focus evaluated values coincide with each other. Thus, focus lens positions at a point P1' (a cross point of the G and R focus evaluated values) in FIG. 8B and at a point P2' in FIG. 8C coincide with each other.

At this time, when an evaluated value of a magnitude relationship is larger than 1, a relationship G focus evaluated value>R focus evaluated value is satisfied. When an evaluated value of a magnitude relationship is smaller than 1, a relationship G focus evaluated value<R focus evaluated value is satisfied.

As described above, these relationships can be obtained even if the calculation method of an evaluated value of a magnitude relationship is changed. Thus, a focus lens drive direction can be determined with the similar configurations and by the similar operations to those described above.

In this manner, an evaluated value of a magnitude relationship is calculated, and a lens drive direction undetectable range is set by setting a plurality of thresholds. This can reduce the possibility of erroneously detecting a direction in the vicinity of a focus position in a lens drive direction determination operation, so as to perform focus adjustment at high speed.

Second Exemplary Embodiment

Hereinafter, an imaging apparatus according to the second exemplary embodiment will be described with reference to FIGS. 9 to 13B. The second exemplary embodiment differs from the first exemplary embodiment mainly in the configuration of specifying a lens driving method to be used when a lens drive direction is undetectable.

In the second exemplary embodiment, by setting a focus evaluated value threshold for the Y focus evaluated value, a defocus state in a lens drive direction undetectable range is determined based on a magnitude relationship with the focus evaluated value threshold. Since a defocus state can be determined, a lens driving method more suitable for each defocus state can be specified.

In addition, a block diagram (FIG. 2) of an imaging apparatus including a focus adjustment device, a block diagram (FIG. 3) of a circuit for calculating various evaluated values for AF, and drawings (FIGS. 4A to 5C) for describing an AF operation, according to the second exemplary embodiment have similar configurations to those according to the first exemplary embodiment. In addition, similar operations are performed. Thus, the descriptions thereof will be omitted.

Figure 9:
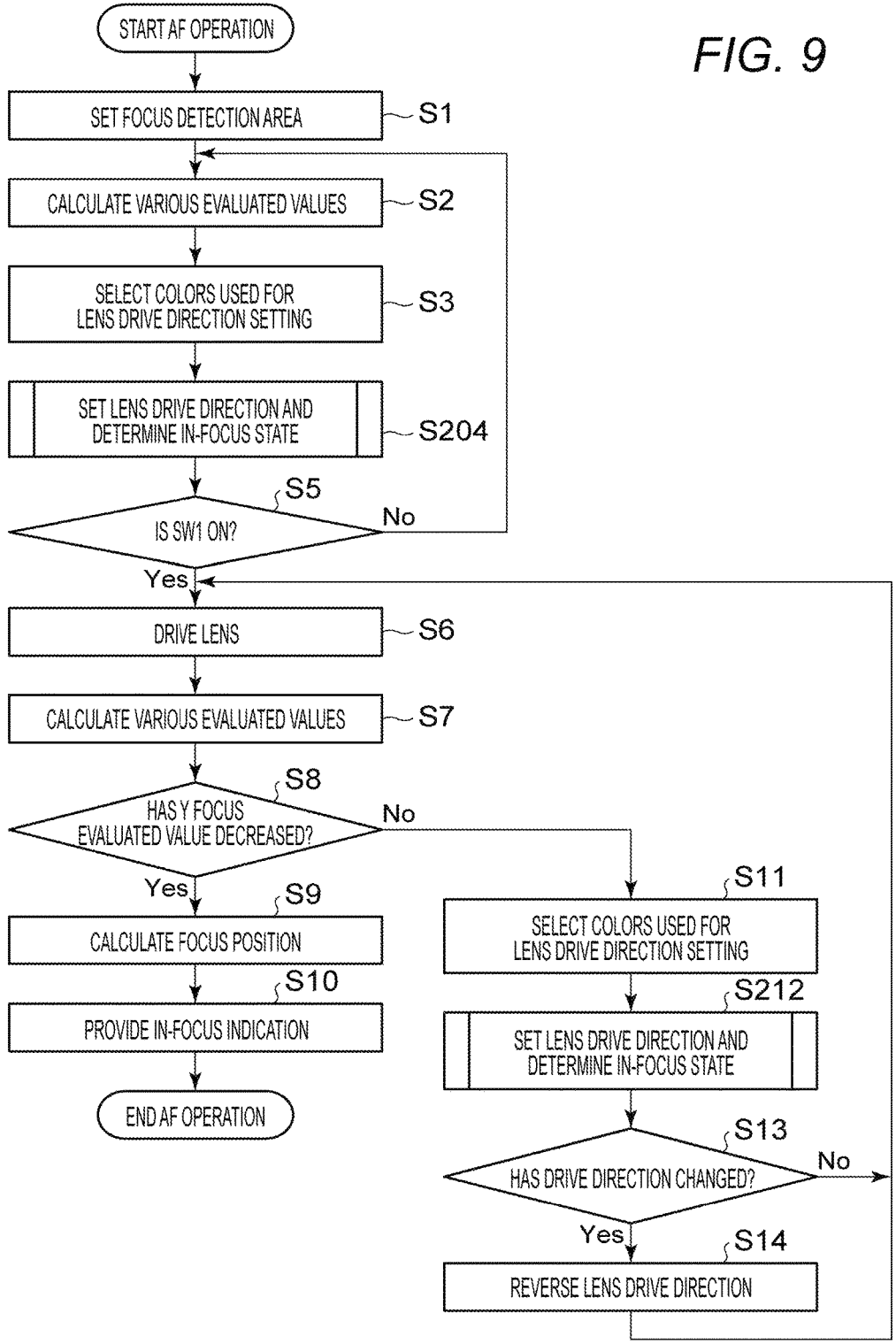
FIG. 9 is a flowchart illustrating an AF operation procedure according to a second exemplary embodiment.
Figure 10:
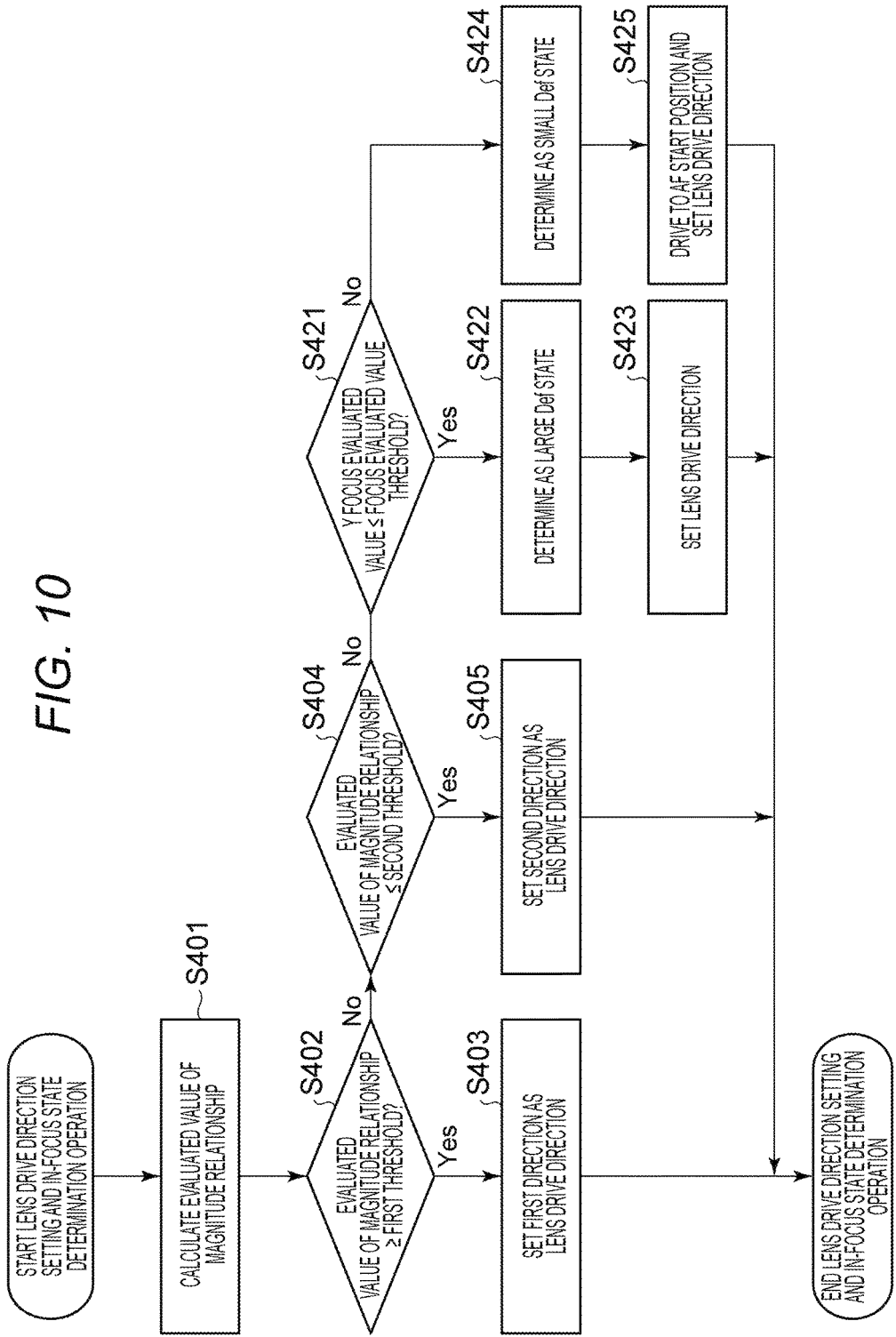
FIG. 10 is a flowchart illustrating focus lens drive direction setting and a defocus state determination operation procedure according to the second exemplary embodiment.

The description will be given of a flowchart in FIG. 9 illustrating an AF operation procedure according to the second exemplary embodiment that is different in processing content from the first exemplary embodiment, and a flowchart in FIG. 10 illustrating a lens drive direction setting and a defocus state determination operation procedure, which corresponds to a subroutine of FIG. 9. All the processes in FIG. 9 are performed by the CPU 15.

In addition, in FIG. 9, steps other than steps S204 and S212 have similar configurations also in the second exemplary embodiment, and similar operations are performed in these steps. Thus, the descriptions thereof will be omitted.

In addition, processes performed in steps S204 and S212 correspond to a similar subroutine illustrated in FIG. 10, and similar operations are performed in these steps. Thus, only step S204 will be described, and the description of step S212 will be omitted.

In step S204 in FIG. 9, a lens drive direction is set and simultaneously, a defocus state is determined, using two colors determined in step S3. The details of the process will be described using the flowchart in FIG. 10.

In addition, in FIG. 10, in steps having the same step numbers as those in FIG. 6, similar operations are performed. Thus, the descriptions thereof will be omitted.

Steps S421 to S425 will be described below.

If it is determined in step S402 that an evaluated value of a magnitude relationship is less than the first threshold (NO in step S402), the processing proceeds to step S404. If it is determined in step S404 that an evaluated value of a magnitude relationship is more than the second threshold (NO in step S404), the processing proceeds to step S421. In step S421, it is determined whether a Y focus evaluated value is equal to or smaller than a focus evaluated value threshold.

Figure 11A:
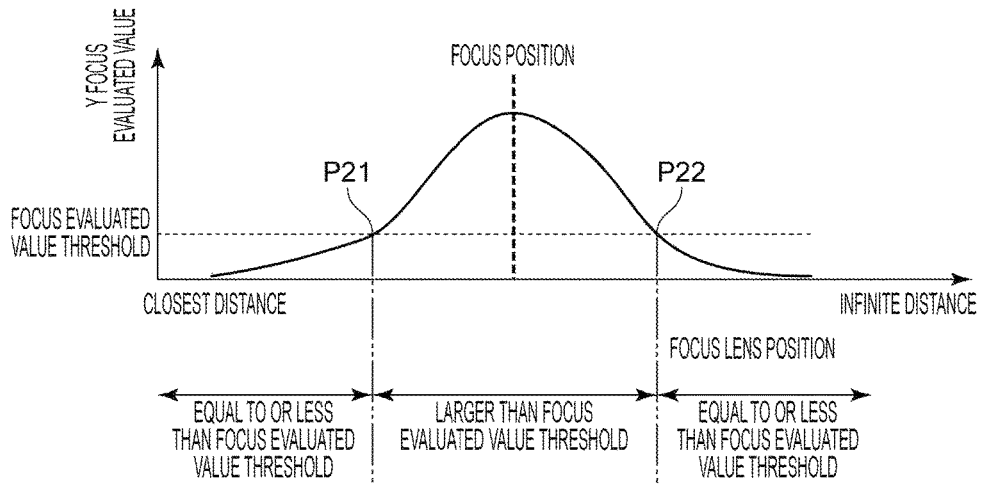
FIG. 11A is a diagram illustrating a relationship between a Y focus evaluated value and a focus lens drive direction according to the second exemplary embodiment.

Here, FIG. 11A is a diagram illustrating a relationship between a Y focus evaluated value and a focus lens position.

As described above, in an autofocusing method of bringing the subject into focus by detecting a signal according to the contrast of the subject, a focus lens position where the Y focus evaluated value reaches its peak corresponds to a position where the contrast of the subject reaches its peak. This peak-reached position is determined as a focus position of the focus lens.

Figure 11B:
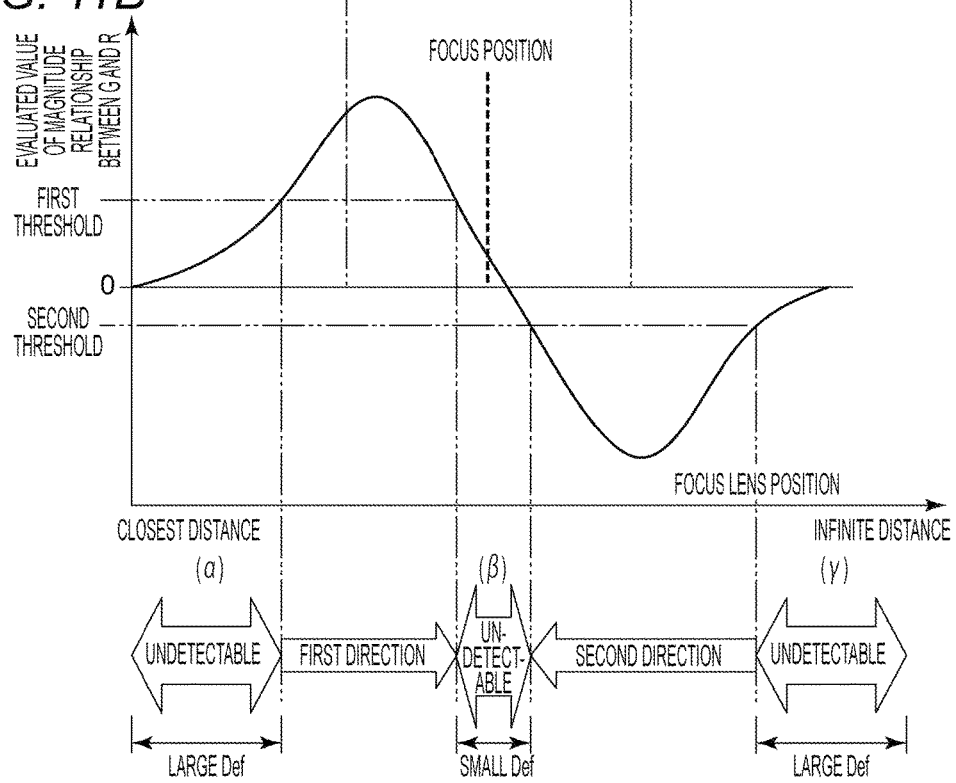
FIG. 11B is a diagram illustrating a relationship between an evaluated value of a magnitude relationship used for focus lens drive direction setting, a focus lens drive direction, and a defocus state.

In addition, FIG. 11B is a diagram illustrating a relationship between G and R focus evaluated values and a focus lens position.

Here, in the above-described first exemplary embodiment, there are undetectable ranges in which a lens drive direction cannot be set. These undetectable ranges correspond to three ranges: a range (hereinafter, referred to as a "closest distance side undetectable range") on a closest distance side of a range in which a lens drive direction is set to the first direction, a range (hereinafter, referred to as an "infinite distance side undetectable range") on an infinite distance side of a range in which a lens drive direction is set to the second direction, and a range therebetween (hereinafter, referred to as a "focus position neighboring undetectable range"). These three ranges are indicated as a closest distance side undetectable range ($\alpha$), a focus position neighboring undetectable range ($\beta$), and an infinite distance side undetectable range ($\gamma$) in FIG. 11B.

Points P21 and P22 in FIG. 11A indicate two intersection points of the focus evaluated value threshold and the Y focus evaluated value. As indicated by dashed-dotted lines connecting between FIGS. 11A and 11B, the focus evaluated value threshold is set so that the point P21 corresponds to a lens position between the ranges ($\alpha$) and ($\beta$), and the point P22 corresponds to a lens position between the ranges ($\beta$) and ($\gamma$). This is because the focus position neighboring undetectable range ($\beta$) needs to be distinguished from the other two undetectable ranges for correctly determining a defocus state.

Referring back to FIG. 10, the description returns to step S421 and subsequent steps. If it is determined in step S421 that the Y focus evaluated value is equal to or smaller than the focus evaluated value threshold (YES in step S421), the processing proceeds to step S422.

In step S422, it is determined that, in the current lens position, a defocus state is large (hereinafter, referred to as "large defocus"), and the processing proceeds to step S423, in which a focus lens drive direction is set. In other words, when the current lens position is in the closest distance side undetectable range ($\alpha$) or the infinite distance side undetectable range ($\gamma$), the defocus state is determined to be large defocus.

The above processing corresponds to a defocus state determination unit for determining that a defocus amount is large in a case in which an evaluated value of a magnitude relationship is smaller than the first threshold and larger than the second threshold, and in a case in which magnitudes of focus evaluated values of the respective colors are equal to or smaller than a predetermined focus evaluated value threshold.

In step S423, a focus lens drive direction is set to the closest distance side. The focus lens is driven to the closest distance side because a subject onto which a photographer adjusts the focus often exists on the closest distance side.

Upon completion of the process in step S423, the subroutine ends.

On the other hand, if it is determined in step S421 that the Y focus evaluated value is larger than the focus evaluated value threshold (NO in step S421), the processing proceeds to step S424.

In step S424, it is determined that, in the current lens position, a defocus state is small (hereinafter, referred to as "small defocus"). In other words, the focus lens is determined to be in the vicinity of a focus position, and the processing proceeds to step S425, in which lens driving for small defocus is performed. In other words, when the current lens position is in the focus position neighboring undetectable range ($\beta$), the defocus state is determined to be small defocus.

The above processing corresponds to a defocus state determination unit for determining that a defocus amount is small in a case in which an evaluated value of a magnitude relationship is smaller than the first threshold and larger than the second threshold, and in a case in which magnitudes of focus evaluated values of the respective colors are larger than the predetermined focus evaluated value threshold.

In step S425, a position to which the focus lens is moved in the infinite distance direction by a predetermined amount X is set as an AF start position, and furthermore, a lens drive direction is set to a closest distance direction. The lens drive direction is set to the closest distance direction because a subject onto which a photographer adjusts the focus often exists on the closest distance side.

The above processing corresponds to driving the focus lens in a predetermined direction by a predetermined amount, and then driving the focus lens in an opposite direction to the predetermined direction to acquire a focus evaluated value, in a case in which the defocus state determination unit determines that a defocus amount is small. Upon completion of the process in step S425, the subroutine ends.

Figure 12:
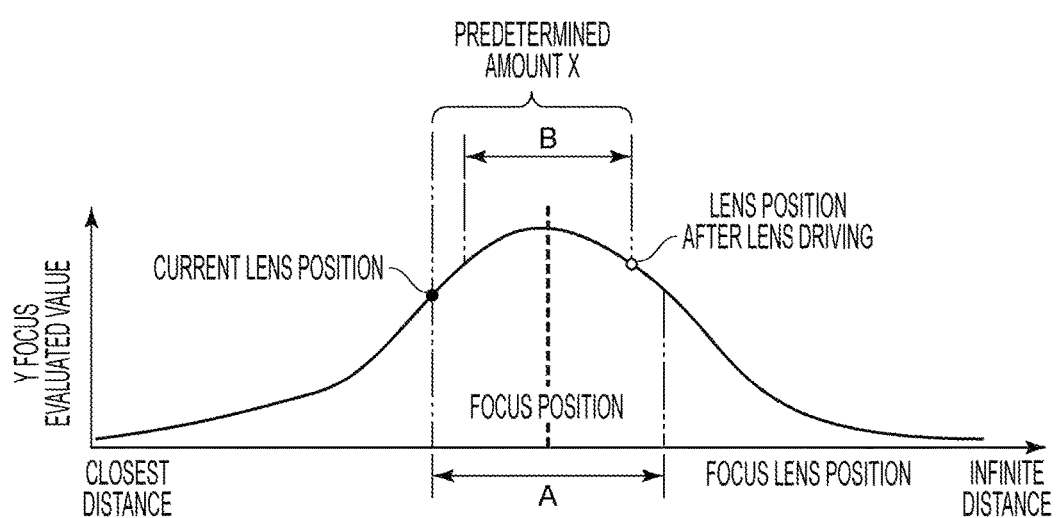
FIG. 12 is a diagram illustrating focus lens driving in the vicinity of a focus position according to the second exemplary embodiment.

Here, the calculation method of the predetermined amount X will be described. FIG. 12 is a diagram illustrating a relationship between a Y focus evaluated value and a focus lens position.

A range A in FIG. 12 indicates a range in which the defocus state is determined to be a small defocus state.

A scan range B in FIG. 12 indicates a scan range necessary for calculating a focus position.

On the other hand, in step S425, it is unknown in which position in the range A the current focus lens position (indicated by a black point) exists. Thus, a drive amount represented by the following formula needs to be set for reliably setting the AF start position (indicated by a white point) to the outside of the scan range B:

$$\text{predetermined amount } X=A/2+B/2 \qquad (12).$$

By calculating the predetermined amount X in the above-described manner, the focus lens can reliably pass through the focus position after the AF start, so that focus detection can be performed at high speed.

In this manner, by setting the focus evaluated value threshold for the Y focus evaluated value, a defocus state in the lens drive direction undetectable range is determined based on the magnitude relationship with the focus evaluated value threshold. Furthermore, since a defocus state can be determined, a lens driving method more suitable for each defocus state can be specified.

Third Exemplary Embodiment

Figure 13A:
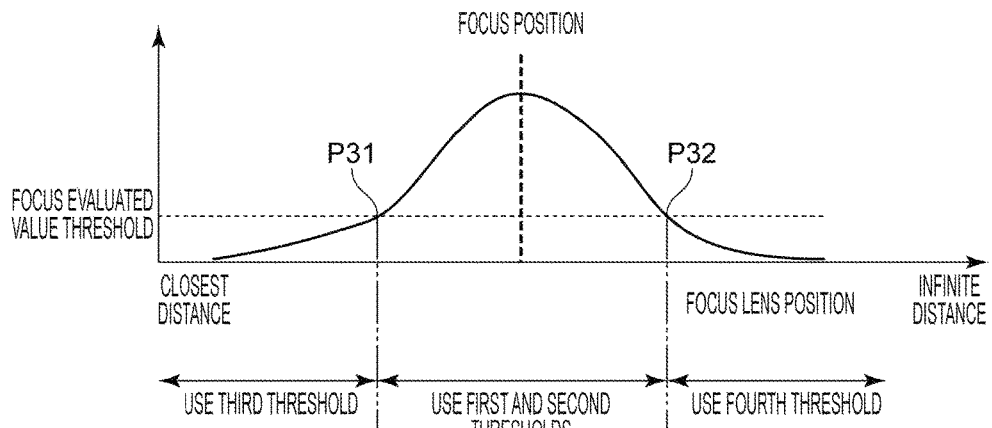
FIG. 13A is a diagram illustrating a relationship between a Y focus evaluated value and a focus lens drive direction according to a third exemplary embodiment.
Figure 13B:
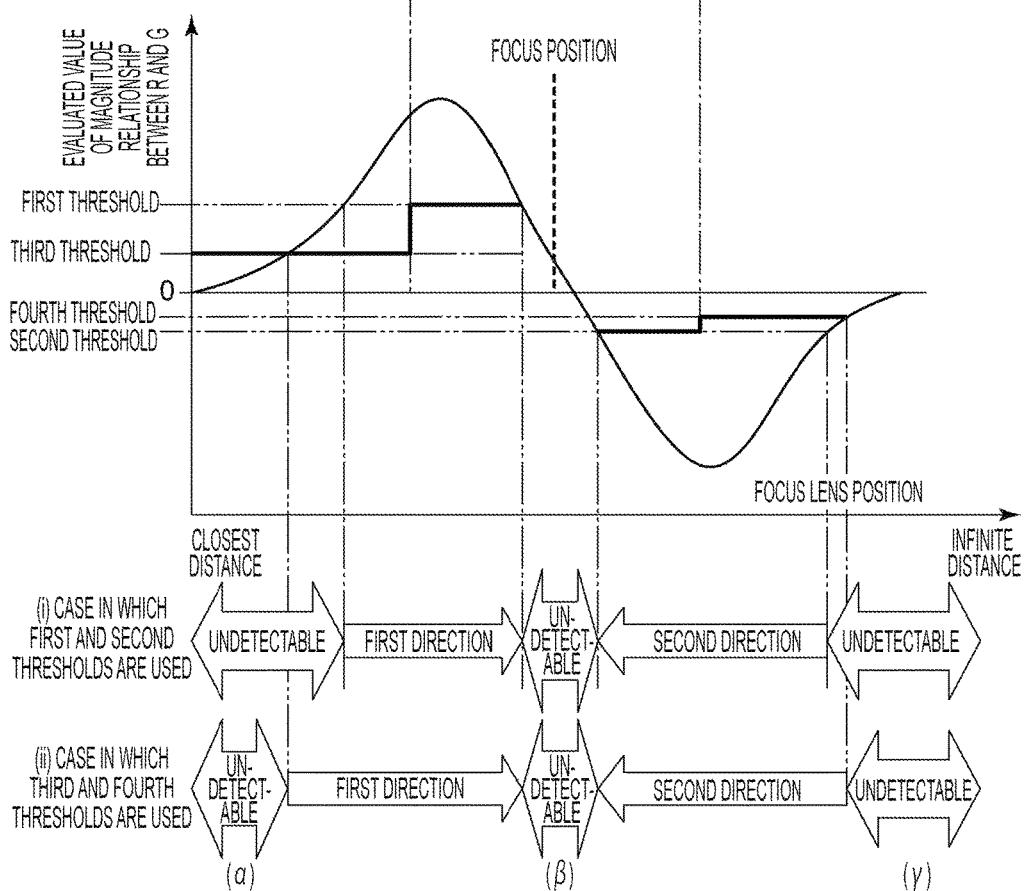
FIG. 13B is a diagram illustrating a relationship between an evaluated value of a magnitude relationship used for focus lens drive direction setting and a focus lens drive direction.

Hereinafter, an imaging apparatus according to the third exemplary embodiment will be described with reference to FIGS. 9, 13A, and 13B. FIG. 13A is a diagram illustrating a relationship between a Y focus evaluated value and a focus lens drive direction according to the third exemplary embodiment. FIG. 13B is a diagram illustrating a relationship between an evaluated value of a magnitude relationship used for focus lens drive direction setting and a focus lens drive direction. The third exemplary embodiment differs from the first exemplary embodiment mainly in a setting method of a threshold for an evaluated value of a magnitude relationship. In the above-described first exemplary embodiment, there are three undetectable ranges in which a lens drive direction cannot be set. That is, there are the closest distance side undetectable range, the infinite distance side undetectable range, and the focus position neighboring undetectable range. These three ranges are indicated as a closest distance side undetectable range (α), a focus position neighboring undetectable range (β), and an infinite distance side undetectable range (γ) in FIG. 13B.

In addition, in the above-described first exemplary embodiment, a range obtained by adding an allowance of a predetermined amount to a range in which a lens drive direction is erroneously detected in the vicinity of the focus position is defined as a range smaller than the first threshold and larger than the second threshold. Nevertheless, these two thresholds are thresholds set for excluding the erroneous detection range in the vicinity of the focus position, and not values set for excluding the closest distance side undetectable range and the infinite distance side undetectable range among the three undetectable ranges.

Thus, in the third exemplary embodiment, a purpose for setting the closest distance side undetectable range (α) and the infinite distance side undetectable range (γ) is reset from a purpose for excluding the erroneous detection range in the vicinity of the focus position to a purpose for preventing erroneous detection due to noise in an evaluated value of a magnitude relationship.

Specifically, in addition to the first and second thresholds set in accordance with the focus position neighboring undetectable range (β), a third threshold and a fourth threshold are newly set in accordance with the closest distance side undetectable range (α) and the infinite distance side undetectable range (γ), respectively. The third threshold is smaller than the first threshold, and the fourth threshold is larger than the second threshold and smaller than the third threshold.

Furthermore, a focus evaluated value threshold is set for the Y focus evaluated value, and based on the magnitude relationship with the focus evaluated value threshold, either a case of using the first and second thresholds or a case of using the third and fourth thresholds is selected. The selection processing corresponds to substituting the third threshold for the first threshold and the fourth threshold for the second threshold when a focus evaluated value is smaller than a focus evaluated value threshold as a predetermined value.

When the third and fourth thresholds are selected, the closest distance side undetectable range (α) and the infinite distance side undetectable range (γ) narrow, so that lens drive direction determination can be performed in a wider range.

In addition, a block diagram (FIG. 2) of an imaging apparatus including a focus adjustment device, a block diagram (FIG. 3) of a circuit for calculating various evaluated values for AF, and drawings (FIGS. 1, and 4A to 5C) for describing an AF operation, according to the third exemplary embodiment have similar configurations to those according to the first exemplary embodiment. In addition, similar operations are performed. Thus, the descriptions thereof will be omitted.

Figure 14:
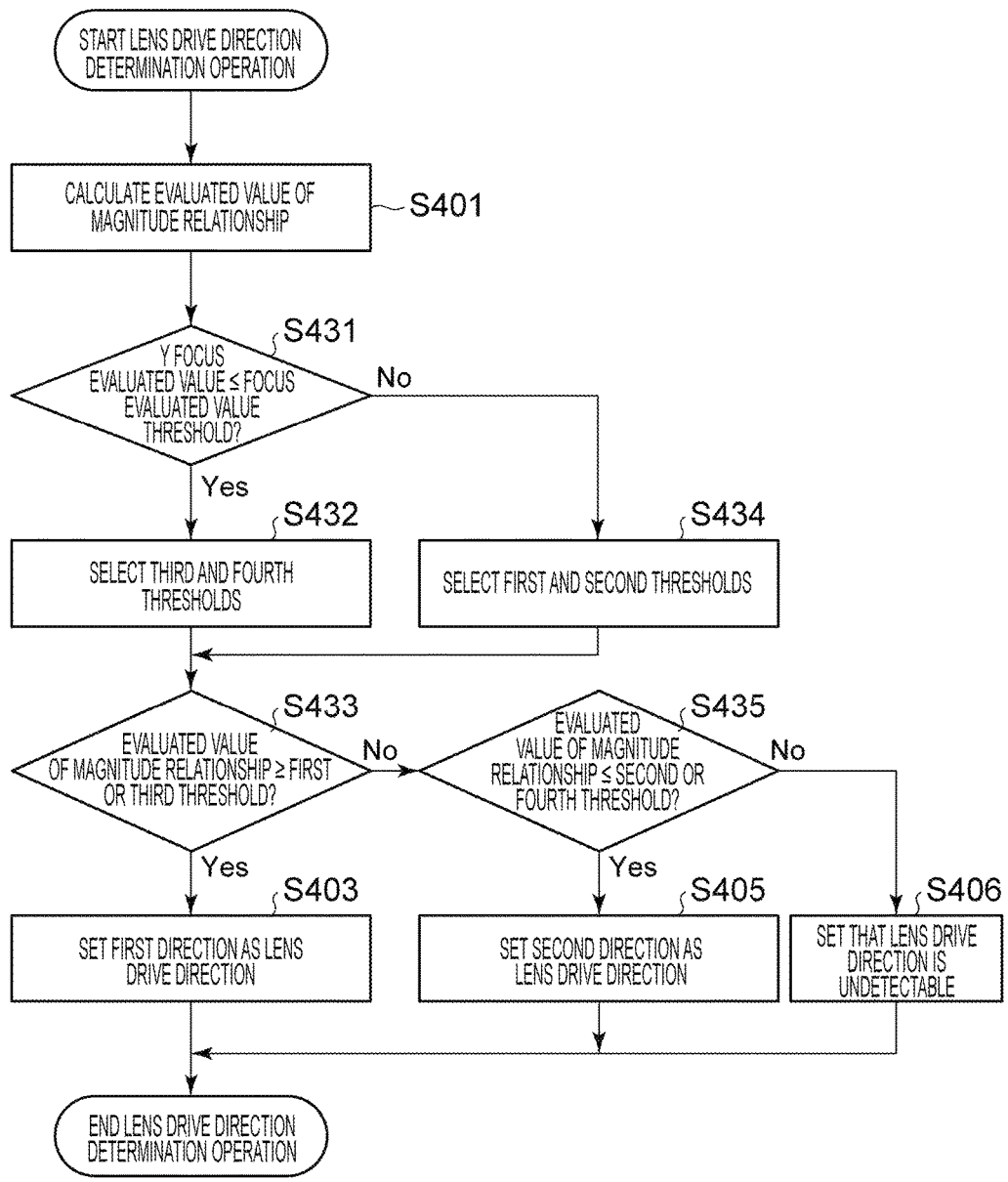
FIG. 14 is a flowchart illustrating a lens drive direction determination operation procedure according to the third exemplary embodiment.

The description will be given of the diagrams in FIGS. 13A and 13B illustrating a relationship between an evaluated value of a magnitude relationship and a focus lens drive direction, and a flowchart in FIG. 14 illustrating a lens drive direction determination operation procedure, according to the third exemplary embodiment different in processing content from the first exemplary embodiment.

First, the flowchart in FIG. 14 will be described.

In addition, in FIG. 14, in steps having the same step numbers as those in FIG. 6, similar operations are performed. Thus, the descriptions thereof will be omitted.

In step S431, it is determined whether the Y focus evaluated value is equal to or smaller than the focus evaluated value threshold.

Here, FIG. 13A is a diagram illustrating a relationship between a Y focus evaluated value and a focus lens position.

As described above, in an autofocusing method of bringing the subject into focus by detecting a signal according to the contrast of the subject, a focus lens position where the Y focus evaluated value reaches its peak corresponds to a position where the contrast of the subject reaches its peak, and is determined as a focus position of the focus lens.

In addition, FIG. 13B is a diagram illustrating a relationship between an evaluated value of a magnitude relationship between G and R and a focus lens position.

Points P31 and P32 in FIG. 13A indicate two intersection points of the focus evaluated value threshold and the Y focus evaluated value. As indicated by dashed-dotted lines connecting between FIGS. 13A and 13B, the focus evaluated value threshold is set so that the point P31 corresponds to a lens position between the ranges (α) and (β), and the point P32 corresponds to a lens position between the ranges (β) and (γ). This is for changing a threshold to be applied by distinguishing the focus position neighboring undetectable range (β) from the other two undetectable ranges.

Referring back to FIG. 14, the description returns to step S431. If it is determined in step S431 that the Y focus evaluated value is equal to or smaller than the focus evaluated value threshold (YES in step S431), the processing proceeds to step S432.

In step S432, a combination of the third and fourth thresholds is selected, and the processing proceeds to step S433. When the Y focus evaluated value is equal to or smaller than the focus evaluated value threshold, and when a lens drive direction is undetectable, the focus lens is in either one of the closest distance side undetectable range and the infinite distance side undetectable range among the three undetectable ranges. In other words, the combination of the third and fourth thresholds is selected so as to narrow the undetectable ranges. As illustrated in FIG. 13B, the undetectable ranges in a case (ii) are narrower than those in a case (i).

Referring back to FIG. 14, the description returns to step S431. If it is determined in step S431 that the Y focus evaluated value is larger than the focus evaluated value threshold (NO in step S431), the processing proceeds to step S434.

In step S434, a combination of the first and second thresholds is selected, and the processing proceeds to step S433. When the Y focus evaluated value is larger than the focus evaluated value threshold, and when a lens drive direction is undetectable, the focus lens is in the focus position neighboring undetectable range among the three undetectable ranges. In other words, similarly to the first exemplary embodiment, the first and second thresholds can be desirably used.

If the third and fourth thresholds are selected in step S432, in step S433, it is determined whether an evaluated value of a magnitude relationship is equal to or larger than the third threshold. In addition, if the first and second thresholds are selected in step S434, in step S433, it is determined whether an evaluated value of a magnitude relationship is equal to or larger than the first threshold.

If it is determined in step S433 that an evaluated value of a magnitude relationship is equal to or larger than the third or the first threshold (YES in step S433), the processing proceeds to step S403, in which the first direction is set as a lens drive direction. Upon completion of the process in step S403, the subroutine ends. If it is determined in step S433 that an evaluated value of a magnitude relationship is less than the third or the first threshold (NO in step S433), the processing proceeds to step S435.

If the third and fourth thresholds are selected in step S432, in step S435, it is determined whether an evaluated value of a magnitude relationship is equal to or smaller than the fourth threshold. In addition, if the first and second thresholds are selected in step S434, in step S435, it is determined whether an evaluated value of a magnitude relationship is equal to or smaller than the second threshold.

If it is determined that an evaluated value of a magnitude relationship is equal to or smaller than the second or the fourth threshold (YES in step S435), the processing proceeds to step S405, in which the second direction is set as a lens drive direction. Upon completion of the process in step S405, the subroutine ends.

If it is determined in step S435 that an evaluated value of a magnitude relationship is larger than the second or the fourth threshold (NO in step S435), the processing proceeds to step S406, in which it is set that a lens drive direction is undetectable. Upon completion of the process in step S406, the subroutine ends.

In this manner, the third and fourth thresholds are newly set in addition to the first and second thresholds, and either the case of using the first and second thresholds or the case of using the third and fourth thresholds is selected. With this configuration, when the third and fourth thresholds are selected, the closest distance side undetectable range (α) and the infinite distance side undetectable range (γ) narrow, so that lens drive direction determination can be performed in a wider range.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-001632, filed Jan. 7, 2015, which is hereby incorporated by reference herein in its entirety.

What is claimed is:
1. A focus adjustment device comprising:
an acquisition unit configured to acquire focus evaluated values of a plurality of color signals obtained from an image signal generated by an image sensor that light transmitted through a focus lens has entered;
a calculation unit configured to calculate at least one value indicating a difference in magnitude between each pair of the focus evaluated values of the plurality of color signals; and
a determination unit configured to determine, in a case in which a value calculated by the calculation unit is within a predetermined range, a drive direction of the focus lens based on the value calculated by the calculation unit, and determine, in a case in which the value calculated by the calculation unit is outside the predetermined range, a drive direction of the focus lens based on a luminance signal obtained from the image signal.

2. The focus adjustment device according to claim 1, wherein, in a case in which the value calculated by the calculation unit is equal to or larger than a first threshold, the determination unit sets a drive direction of the focus lens to a first direction,
wherein, in a case in which the value calculated by the calculation unit is equal to or smaller than a second threshold that is smaller than the first threshold, the determination unit sets a drive direction of the focus lens to a second direction that is an opposite direction to the first direction, and
wherein, in a case in which the value calculated by the calculation unit is smaller than the first threshold and larger than the second threshold, the determination unit sets a drive direction of the focus lens based on a luminance signal obtained from the image signal.

3. The focus adjustment device according to claim 2, wherein, in a case in which at least one of the focus evaluated values of the plurality of color signals is larger than a fifth threshold, the determination unit sets a drive direction of the focus lens using the first and second thresholds, and
wherein, in a case in which at least one of the focus evaluated values of the plurality of color signals is equal to or smaller than the fifth threshold, the determination unit sets a drive direction of the focus lens using a third threshold smaller than the first threshold, and a fourth threshold smaller than the third threshold and larger than the second threshold, instead of the first and second thresholds.

4. The focus adjustment device according to claim 2, wherein, in a case in which a focus evaluated value of a luminance signal obtained from the image signal is larger than a fifth threshold, the determination unit sets a drive direction of the focus lens using the first and second thresholds, and
wherein, in a case in which a focus evaluated value of a luminance signal obtained from the image signal is equal to or smaller than the fifth threshold, the determination unit sets a drive direction of the focus lens using a third threshold smaller than the first threshold, and a fourth threshold smaller than the third threshold and larger than the second threshold, instead of the first and second thresholds.

5. The focus adjustment device according to claim 2, wherein the calculation unit calculates a difference between each of the focus evaluated values of the plurality of color signals, and the first threshold is a positive value and the second threshold is a negative value.

6. The focus adjustment device according to claim 2, wherein the calculation unit calculates a ratio between each of the focus evaluated values of the plurality of color signals, and the first threshold is a value larger than 1 and the second threshold is a value smaller than 1.

7. The focus adjustment device according to claim 2, further comprising a defocus state determination unit,
wherein, in a case in which the value calculated by the calculation unit is smaller than the first threshold and larger than the second threshold, the defocus state determination unit determines that a defocus amount is small if magnitudes of the focus evaluated values of the plurality of color signals are larger than a predetermined focus evaluated value threshold, and determines that a defocus amount is large if magnitudes of the focus evaluated values of the plurality of color signals are equal to or smaller than the predetermined focus evaluated value threshold.

8. The focus adjustment device according to claim 7, further comprising a control unit,
wherein, in a case in which the defocus state determination unit determines that a defocus amount is small, the control unit drives the focus lens in a predetermined direction by a predetermined amount, and then drives the focus lens in an opposite direction to the predetermined direction.

9. An imaging apparatus comprising:
an image sensor that light transmitted through a focus lens has entered;
an acquisition unit configured to acquire focus evaluated values of a plurality of color signals obtained from an image signal generated by the image sensor;
a calculation unit configured to calculate at least one value indicating a difference in magnitude between each pair of the focus evaluated values of the plurality of color signals; and
a determination unit configured to determine, in a case in which a value calculated by the calculation unit is within a predetermined range, a drive direction of the focus lens based on the value calculated by the calculation unit, and determine, in a case in which the value calculated by the calculation unit is outside the predetermined range, a drive direction of the focus lens based on a luminance signal obtained from the image signal.

10. A focus adjustment method comprising:
acquiring focus evaluated values of a plurality of color signals obtained from an image signal generated by an image sensor that light transmitted through a focus lens has entered;
calculating at least one value indicating a difference in magnitude between each pair of the focus evaluated values of the plurality of color signals; and
determining, in a case in which a calculated value indicating a difference in magnitude between the focus evaluated values is within a predetermined range, a drive direction of the focus lens based on the calculated value indicating the difference in magnitude between the focus evaluated values, and determining, in a case in which the calculated value indicating the difference in magnitude between the focus evaluated values is outside the predetermined range, a drive direction of the focus lens based on a luminance signal obtained from the image signal.

11. A computer-readable storage medium storing a program for causing a computer to execute each step in a control method of a focus adjustment device, the control method comprising:

acquiring focus evaluated values of a plurality of color signals obtained from an image signal generated by an image sensor that light transmitted through a focus lens has entered;

calculating at least one value indicating a difference in magnitude between each pair of the focus evaluated values of the plurality of color signals; and determining, in a case in which a calculated value indicating a difference in magnitude between the focus evaluated values is within a predetermined range, a drive direction of the focus lens based on the calculated value indicating the difference in magnitude between the focus evaluated values, and determining, in a case in which the calculated value indicating the difference in magnitude between the focus evaluated values is outside the predetermined range, a drive direction of the focus lens based on a luminance signal obtained from the image signal.

* * * * *